(12) United States Patent
Dotan-Cohen et al.

(10) Patent No.: US 11,816,609 B2
(45) Date of Patent: Nov. 14, 2023

(54) INTELLIGENT TASK COMPLETION DETECTION AT A COMPUTING DEVICE

(71) Applicant: MICROSOFT TECHNOLOGY LICENSING, LLC, Redmond, WA (US)

(72) Inventors: Dikla Dotan-Cohen, Netanya (IL); Adar Vit, Hadera (IL); Tom Braude, Tel Aviv (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 101 days.

(21) Appl. No.: 17/375,908

(22) Filed: Jul. 14, 2021

(65) Prior Publication Data
US 2023/0014775 A1 Jan. 19, 2023

(51) Int. Cl.
*G06F 40/30* (2020.01)
*G06F 3/0482* (2013.01)
*G06Q 10/0631* (2023.01)
*G06N 20/00* (2019.01)
*G06F 40/289* (2020.01)
*H04L 51/046* (2022.01)

(52) U.S. Cl.
CPC ... *G06Q 10/063114* (2013.01); *G06F 3/0482* (2013.01); *G06F 40/289* (2020.01); *G06F 40/30* (2020.01); *G06N 20/00* (2019.01); *H04L 51/046* (2013.01)

(58) Field of Classification Search
CPC ........ G06Q 10/063; G06Q 10/063114; G06Q 10/1097; G06F 3/048; G06F 40/02; G06F 40/30; G06F 3/0482; G06F 40/289; G06F 40/284; G06N 20/00; H04L 51/046
See application file for complete search history.

(56) References Cited

U.S. PATENT DOCUMENTS

| 9,378,456 B2 | 6/2016 | White et al. |
| 9,514,424 B2 | 12/2016 | Kleinbart et al. |
| 9,696,886 B2 | 7/2017 | Krishnappa et al. |
| 9,965,733 B2 | 5/2018 | Xu |
| 2004/0210470 A1* | 10/2004 | Rusk ............... G06Q 10/10 705/7.15 |

(Continued)

OTHER PUBLICATIONS

"Task Analysis", Retrieved from: https://web.archive.org/web/20210318111832/https://www.usability.gov/how-to-and-tools/methods/task-analysis.html, Mar. 18, 2021, 2 Pages.

(Continued)

*Primary Examiner* — Beau D Spratt
*Assistant Examiner* — Kuang F Chen
(74) *Attorney, Agent, or Firm* — SHOOK, HARDY & BACON L.L.P.

(57) ABSTRACT

Computerized systems and methods are provided for automatically detecting an indication that a task has been completed and associated user interface functionality. These systems and methods improve existing technologies by automatically detecting indications that tasks have been completed via new logic or rules and improving the functionality and computing resource consumption relative to existing machine learning models. These systems also improve the way computers operate by reducing computing resource consumption, such as memory, network latency, I/O, and the like.

19 Claims, 11 Drawing Sheets

(56) References Cited

U.S. PATENT DOCUMENTS

| | | | |
|---|---|---|---|
| 2009/0044131 A1* | 2/2009 | Pylappan | G06F 16/44 |
| | | | 715/752 |
| 2009/0202226 A1* | 8/2009 | McKay | G09B 5/06 |
| | | | 704/260 |
| 2016/0262128 A1* | 9/2016 | Hailpern | G06F 40/10 |
| 2017/0372253 A1 | 12/2017 | Nandi et al. | |
| 2018/0197125 A1* | 7/2018 | Standefer, III | G06Q 10/06311 |
| 2019/0087067 A1* | 3/2019 | Hovden | G06F 3/04815 |
| 2020/0005248 A1* | 1/2020 | Gerzi | G06Q 10/1097 |
| 2020/0104169 A1* | 4/2020 | Powell | G06F 9/4887 |
| 2021/0073293 A1 | 3/2021 | Fenton et al. | |
| 2021/0142000 A1* | 5/2021 | Vis | G06F 3/0481 |
| 2021/0366490 A1* | 11/2021 | Hsieh | G10L 17/02 |
| 2021/0406836 A1* | 12/2021 | Bar-on | G06Q 10/107 |
| 2023/0041690 A1* | 2/2023 | Huang | G06Q 10/1097 |

OTHER PUBLICATIONS

Kalia, et al., "Identifying Business Tasks and Commitments from Email and Chat Conversations", In Technical Report, HP Labs, Feb. 6, 2013, 22 Pages.

White, et al., "Task Completion Detection: A Study in the Context of Intelligent Systems", In Proceedings of the 42nd International Conference on Research and Development in Information Retrieval, Jul. 21, 2019, pp. 405-414.

Alibadi, et al., "Using Pre-trained Embeddings to Detect the Intent of an Email", In Proceedings of the 7th ACIS International Conference on Applied Computing and Information Technology, May 29, 2019, pp. 6-12.

"International Search Report and Written Opinion Issued in PCT Application No. PCT/US22/037004", dated Oct. 6, 2022, 12 Pages.

* cited by examiner

FIG. 6.

KELLY SIMPSON – DEMO FOLLOW UP
CALL TIME 1MIN 27SEC
2:54 PM – MARCH 2, 2019

CONVERSATION    RELATED OPPORTUNITY ( TASK (1) )  ( KEYWORDS (4) )  ( TRACKED KEYWORDS (4) )
( BRANDS (4) )  ( COMPETITORS (4) )  ( COMPLETED TASKS (3) ) — 612

KS  KELLY SIMPSON
    00:00:00
HELLO

LB  LYDIA BAUER
    00:00:03
HELLO THIS IS LYDIA FROM CONTOSO, HOW ARE YA?

KS  KELLY SIMPSON
    00:00:11
GOOD, HOW ARE YOU?

LB  LYDIA BAUER
    00:00:14
THANKS FOR YOUR TIME, I WILL SEND YOU THE DOCUMENT
FOR SIGNATURE BY TOMORROW MORNING

KS  KELLY SIMPSON
    00:00:23
OK

LB  LYDIA BAUER
    00:00:26
ALRIGHT! I PULLED UP YOUR INFORMATION ON OUR SYSTEM
AND WANTED TO CHECK IF YOU ARE INTERESTED IN OUR
LATEST 3D PRINTER OFFERING AND ITS SPECIFICATIONS?

KS  KELLY SIMPSON
    00:00:33
NO, WE ALREADY USE XYZ PRINTER AND NORTHWIND 3D
THAT WORKS JUST FINE.

LB  LYDIA BAUER
    00:00:38
OKAY I JUST SENT YOU THE DOCUMENT

604 — IT APPEARS THAT YOU HAVE COMPLETED YOUR TASK TO SEND THE PRODUCT DESCRIPTION DOCUMENT TO KELLY SIMPSON

DO YOU WANT TO REMOVE THIS TASK?

[ YES ] — 606        [ NO ] — 608

INTELLIGENT TASK COMPLETION DETECTION AT A COMPUTING DEVICE

BACKGROUND

A variety of computer-implemented technologies (e.g., chat, email, virtual meeting applications) are available to assist users in electronic communication. For example, some virtual meeting technologies are configured to receive manual input from users, such as topic of a meeting, date of the meeting, or other notes related to the meeting, and store, in computer memory, the input so that the user can refer back to the information in a graphically displayed format. Advances in computing technology and the increased prevalence of modern computing devices has resulted in a dramatic increase in data available regarding events. Conventional solutions have not kept pace with these advances and have failed to capitalize on the available data, or provide robust functionality in order to address these new challenges.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The technologies described in this disclosure are directed towards computerized systems and methods for automatically detecting an indication (e.g., a particular natural language sentence) that a task has been completed and associated user interface functionality. At a high level and according to some embodiments, this occurs by first detecting, from first natural language content, a candidate task. The candidate task indicates an action that needs to be accomplished by one or more users. For example, embodiments can determine that the phrase "send me the file of the sales numbers" is a candidate task based on semantic and syntactic processing (e.g., by determining that "send" is a command or request word), as well as other contextual information (e.g., a text or email that affirms that a person is to send a spreadsheet file).

Some embodiments additionally receive second natural language content and based at least in part on the contextual information, detect (e.g., via one or more machine learning models) an indication that the candidate task has been completed. For example, particular embodiments can monitor an emailing application and detect, in the second natural language content, a file attachment name or type associated with the candidate task that matches the file attachment name or type in another candidate task message.

Manual note taking or manual computer user input and CPU processing for existing technologies is time consuming and, in many cases, indications that tasks are completed are missed or the corresponding tasks are not removed as tasks, which is inaccurate. Various embodiments of the present disclosure improve these technologies by automatically detecting indications that tasks have been completed via new logic or rules (e.g., a file name or file type specified in the indication) and improving the functionality and computing resource consumption relative to existing machine learning models. Various embodiments of the present disclosure also improve the way computers operate by reducing computing resource consumption (e.g., via data pruning or monitoring for only a subset of signals), such as memory, network latency, I/O, and the like, as described in more detail herein.

BRIEF DESCRIPTION OF THE DRAWINGS

Aspects of the disclosure are described in detail below with reference to the attached drawing figures, wherein:

FIG. 6 is a screenshot of an example user interface illustrating that the user can manually remove indications of task completions, according to some embodiments of this disclosure;

DETAILED DESCRIPTION

Figure 1:
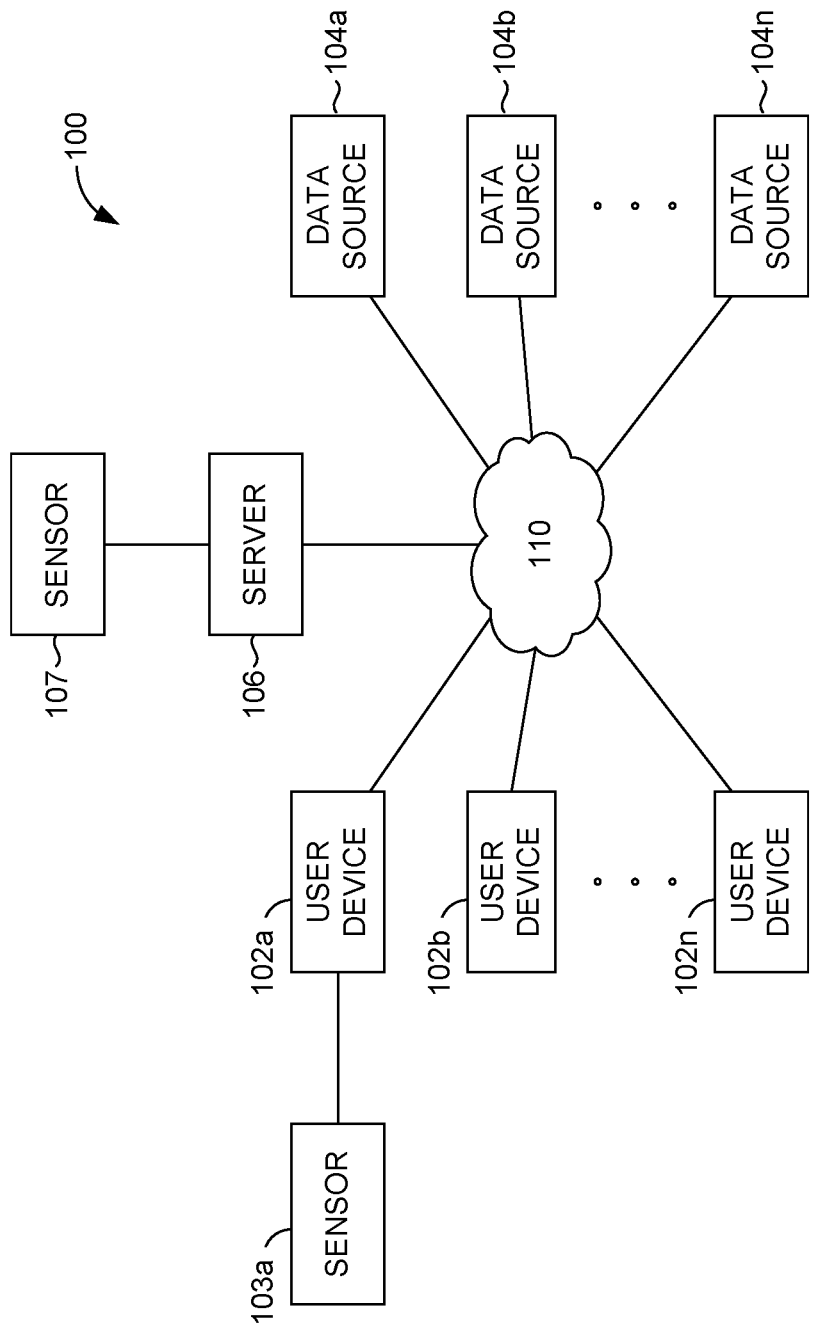
FIG. 1 is a block diagram of an exemplary computing environment suitable for use in implementing some embodiments of this disclosure.

The subject matter of aspects of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. Each method described herein may comprise a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

As described above, conventional technologies have various functionality shortcomings. For instance, word processing or meeting applications may be utilized to record meetings or to capture manual user input, such as a user taking notes. However, these technologies lack functionality to automatically detect a task (e.g., a natural language request to send a file) or indications of whether the task has been completed (e.g., receipt of the file requested). Although some technologies can use natural language processing to tag words as action items or the like, these technologies fail to notify users when such action items or tasks have been completed or are no longer relevant. Accordingly, users may be unnecessarily reminded of tasks. This not only negatively affects the user experience, but this is indicative of inaccuracies because these tasks should be deleted as tasks or at least marked as completed but they are not.

In another example of a functionality shortcoming, some technologies, such as virtual assistants (e.g., smart speakers) fail to automatically detect indications of whether tasks have been completed. While these technologies can generally process natural language requests and perform key word recognition, these technologies cannot generally parse a meeting transcript or other data sets to determine which parts of the data set indicate tasks and which parts indicate completions of those tasks.

Existing machine learning models are also deficient in detecting indications of task completion. Although a machine learning model can utilize natural language processing to make certain classifications or predictions associated with a task, these models are not accurate because they fail to use certain inputs and are not optimized to specifically train by learning the relationships between tasks and responses that indicate completion of those tasks. For example, these models fail to use inputs, such as an attachment name or type mentioned or otherwise associated with a task to better detect the indication of completion (e.g., an upload of the particular file). These models also statically learn based only on generic pre-training and fine-tuning functionality (e.g., masked language modeling), without being fine-tuned to learn specific tasks and indications of completion of such tasks.

Existing machine learning models also unnecessarily consume computing resources. While NLP-based models (e.g., BERT) have led to significant advances, they often have several hundred million parameters. This trend towards larger models raises several concerns. First is the cost of exponentially scaling these models' computational requirements. Second, these large models require extensive computational and memory requirements. This is because all of these parameters must be stored in memory and analyzed at runtime and training to make predictions, making the overhead extensive and unnecessary. Lastly, there are efficiency costs with training existing models. That is, these models take a vast quantity of time to train and deploy in a production environment. This is because most parameters are learned from scratch, taking many epochs and training sessions.

Existing technologies are also inefficient in terms of computer resource consumption (e.g., CPU, memory, I/O, network latency). For example, existing technologies walk entire decision trees or other data structures when engaging in task completion detection. For instance, each node can represent a signal or data source to poll or monitor for task completion. But polling all data sources can increase storage device I/O (e.g., excess physical read/write head movements on non-volatile disk), increase CPU utilization, and/or network latency because each time a node is walked, components have to repetitively reach out to the storage device to perform read/write operations, which is time consuming, error prone, and can eventually wear on components, such as a read/write head.

Various embodiments of the present disclosure provide one or more technical solutions to one or more of these technical problems described above. In operation, particular embodiments are directed to detecting an indication (e.g., a particular natural language sentence) that a task has been completed and associated user interface functionality. In some embodiments, this occurs by first detecting, from first natural language content, a candidate task. The candidate task indicates an action that is a candidate for accomplishment by one or more users. For example, a modified Bidirectional Encoder Representations from Transformers (BERT) machine learning model can process a meeting transcript and predict that the phrase "send me the file of the sales numbers" is a candidate task based on semantic and syntactic processing (e.g., by determining that "send" is a command or request word), as well as other contextual information (e.g., a text or email that affirms that a person is to send a spreadsheet file).

Some embodiments additionally receive second natural language content and based at least in part on the contextual information, detect (e.g., via one or more machine learning models) an indication that the candidate task has been completed. For example, particular embodiments can monitor an emailing application and detect, in the second natural language content, a file attachment name or type associated with the candidate task that matches the file attachment name or type in another candidate task message. For instance, using the illustration above, the email message may say, "here you go," with a spreadsheet application attached. Because the spreadsheet file attachment type was detected previously in the contextual information and the user who was a recipient of the previous text or email was the user who sent another email with the spreadsheet application attached, particular embodiments can predict that the candidate task has been completed based on the indication of the file attachment type and identity of the user. And based at least in part on the detecting, some embodiments cause presentation, at a user device, of an indication that the candidate task has been completed. For example, some embodiments cause a highlighting mark over natural language words (e.g., "here's the file") that indicate that the candidate task has been completed.

Various embodiments improve existing word processing applications, communications application, such as meeting applications, messaging applications, collaboration applications, and virtual assistants, among others, by providing functionality that automatically detects indications that tasks have been completed via new logic or rules (e.g., a file name or file type specified in the indication). As described above, tasks must be manually performed or marked as completed in various existing technologies, and have only been historically performed by humans or manual input of users. In particular embodiments, incorporating these particular rules improves existing technological processes by providing new functionality that effectively performs these tasks automatically and more accurately. Particular embodiments notify users when such tasks have been completed or are no longer relevant or delete such tasks so that users will not see them as tasks. Accordingly, users are not unnecessarily reminded of tasks. This not only improves the user experience relative to existing technologies, but improves the accuracy relative to existing technologies because such tasks are deleted or at least marked as completed.

Particular embodiments further improve the functionality relative to existing machine learning models. Particular embodiments use models that are more accurate because they use certain inputs and are optimized to specifically train by learning the relationships between tasks and responses that indicate completion of those tasks (e.g., via a modified pre-training and fine-tuning phase). For example, some embodiments use models that take, as input, an attachment name or type mentioned or otherwise associated with a task to better detect the indication of completion (e.g., an upload of the particular file).

Particular embodiments also improve machine learning computing resource consumption, such as memory and latency. As described above, existing models, such as BERT models, typically train on several hundred million parameters, which is costly in terms of computation and memory. Various embodiments of the present disclosure improve these models by employing modified BERT models or encoders, which in some embodiments, are compressed or smaller versions of regular models. For instance, these compressed models can use millions of fewer parameters using knowledge distillation or other functionality, as described in more detail below. Accordingly, because there are substantially less parameters to work from, not as much data is stored to memory and the computational cost (e.g., latency, CPU utilization, etc.) is much lower. Further, these models can be trained and deployed quicker in a production environment because fewer parameters are learned from scratch, taking fewer epochs or training sessions.

Particular embodiments also improve the way computers operate in terms of computer resource consumption (e.g., CPU, memory, I/O, network latency). For example, instead of walking entire decision trees or other data structures when engaging in task completion detection, particular embodiments can determine that a subset of signals (e.g., a particular application or set of words) are likely to include an indication of completion of the candidate task. And based on the determination, monitor an object for only the subset. For instance, if each node represents a signal or data source to poll or monitor for completion, embodiments can "prune" or remove particular nodes of a graph that does not represent the subset of signals. In this way, the entire graph does not have to be walked, and more specifically, each signal does not have to be listened to or monitored. Accordingly, there is a decrease in storage device I/O (e.g., excess physical read/write head movements on non-volatile disk), a decrease in CPU utilization, and/or network latency because fewer nodes are walked or fewer signals are monitored. Accordingly, components do not have to repetitively reach out to the storage device to perform read/write operations. Likewise, there are not as many packet generation and other network costs because there are fewer signals to monitor and thus fewer network protocol sessions to establish. Additionally, some embodiments do not have to store or transmit entire decision trees or other data structures representing these signals, so there is no unnecessary consumption of memory.

Turning now to FIG. 1, a block diagram is provided showing an example operating environment 100 in which some embodiments of the present disclosure may be employed. It should be understood that this and other arrangements described herein are set forth only as examples. Other arrangements and elements (e.g., machines, interfaces, functions, orders, and groupings of functions) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a number of user devices, such as user devices 102*a* and 102*b* through 102*n*; a number of data sources, such as data sources 104*a* and 104*b* through 104*n*; server 106; sensors 103*a* and 107; and network 110. It should be understood that operating environment 100 shown in FIG. 1 is an example of one suitable operating environment. Each of the components shown in FIG. 1 may be implemented via any type of computing device, such as computing device 1100 described in connection to FIG. 11, for example. These components may communicate with each other via network 110, which may include, without limitation, one or more local area networks (LANs) and/or wide area networks (WANs). In exemplary implementations, network 110 comprises the Internet and/or a cellular network, amongst any of a variety of possible public and/or private networks.

It should be understood that any number of user devices, servers, and data sources may be employed within operating environment 100 within the scope of the present disclosure. Each may comprise a single device or multiple devices cooperating in a distributed environment. For instance, server 106 may be provided via multiple devices arranged in a distributed environment that collectively provide the functionality described herein. Additionally, other components not shown may also be included within the distributed environment.

User devices 102*a* and 102*b* through 102*n* can be client devices on the client-side of operating environment 100, while server 106 can be on the server-side of operating environment 100. Server 106 can comprise server-side software designed to work in conjunction with client-side software on user devices 102*a* and 102*b* through 102*n* so as to implement any combination of the features and functionalities discussed in the present disclosure. This division of operating environment 100 is provided to illustrate one example of a suitable environment, and there is no requirement for each implementation that any combination of server 106 and user devices 102*a* and 102*b* through 102*n* remain as separate entities.

User devices 102*a* and 102*b* through 102*n* may comprise any type of computing device capable of use by a user. For example, in one embodiment, user devices 102*a* through 102*n* may be the type of computing device described in relation to FIG. 11 herein. By way of example and not limitation, a user device may be embodied as a personal computer (PC), a laptop computer, a mobile or mobile device, a smartphone, a tablet computer, a smart watch, a wearable computer, a personal digital assistant (PDA), a music player or an MP3 player, a global positioning system (GPS) or device, a video player, a handheld communications device, a gaming device or system, an entertainment system, a vehicle computer system, an embedded system controller, a camera, a remote control, a bar code scanner, a computerized measuring device, an appliance, a consumer electronic device, a workstation, or any combination of these delineated devices, or any other suitable computer device.

Data sources 104a and 104b through 104n may comprise data sources and/or data systems, which are configured to make data available to any of the various constituents of operating environment 100, or system 200 described in connection to FIG. 2. (For instance, in one embodiment, one or more data sources 104a through 104n provide (or make available for accessing) user data to user-data collection component 210 of FIG. 2.) Data sources 104a and 104b through 104n may be discrete from user devices 102a and 102b through 102n and server 106 or may be incorporated and/or integrated into at least one of those components. In one embodiment, one or more of data sources 104a through 104n comprise one or more sensors 103a, 107, which may be integrated into or associated with one or more of the user device(s) 102a, 102b, or 102n or server 106. Examples of sensed user data made available by data sources 104a through 104n are described further in connection to user-data collection component 210 of FIG. 2.

Figure 2:
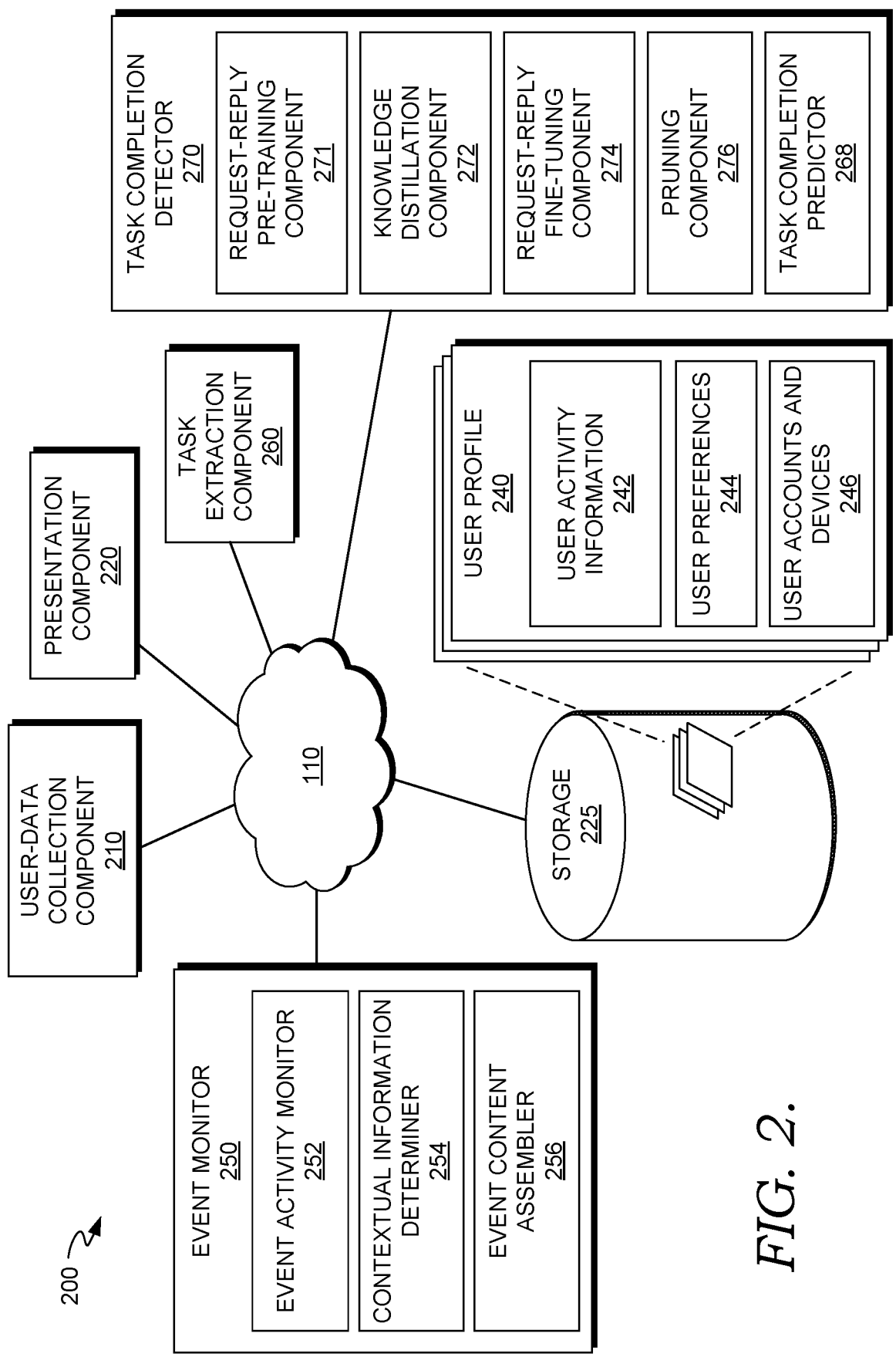
FIG. 2 is a block diagram illustrating an example system in which some embodiments of this disclosure are employed.

Operating environment 100 can be utilized to implement one or more of the components of the task completion detection system 200, described in FIG. 2, including components for automatic action item extraction. Operating environment 100 also can be utilized for implementing aspects of process flows 800, 900, or 1000 of FIGS. 8, 9, and 10 respectively Referring now to FIG. 2, with FIG. 1, a block diagram is provided showing aspects of an example computing system architecture suitable for implementing an embodiment of the disclosure and designated generally as task completion detection system 200. The task completion detection system 200 represents only one example of a suitable computing system architecture. Other arrangements and elements can be used in addition to or instead of those shown, and some elements may be omitted altogether for the sake of clarity. Further, as with operating environment 100, many of the elements described herein are functional entities that may be implemented as discrete or distributed components or in conjunction with other components, and in any suitable combination and location.

Example system 200 includes network 110, which is described in connection to FIG. 1, and which communicatively couples components of system 200 including user-data collection component 210, event monitor 250, task extraction component 260, task completion detector 270, user profile 240, user-data collection component 210, and presentation component 220. These components may be embodied as a set of compiled computer instructions or functions, program modules, computer software services, or an arrangement of processes carried out on one or more computer systems, such as computing device 1100 described in connection to FIG. 11 for example.

In one embodiment, the functions performed by components of system 200 are associated with one or more personal assistant applications, services, or routines. In particular, such applications, services, or routines may operate on one or more user devices (such as user device 102a), servers (such as server 106), may be distributed across one or more user devices and servers, or be implemented in the cloud. Moreover, in some embodiments, these components of system 200 may be distributed across a network, including one or more servers (such as server 106) and client devices (such as user device 102a), in the cloud, or may reside on a user device, such as user device 102a. Moreover, these components, functions performed by these components, or services carried out by these components may be implemented at appropriate abstraction layer(s) such as the operating system layer, application layer, hardware layer of the computing system(s). Alternatively, or in addition, the functionality of these components and/or the embodiments described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs). Additionally, although functionality is described herein with regards to specific components shown in example system 200, it is contemplated that in some embodiments functionality of these components can be shared or distributed across other components.

Continuing with FIG. 2, user-data collection component 210 is generally responsible for accessing or receiving (and in some cases also identifying) user data from one or more data sources, such as data sources 104a and 104b through 104n of FIG. 1. In some embodiments, user-data collection component 210 may be employed to facilitate the accumulation of user data of a particular user (or in some cases, a plurality of users including crowdsourced data) for the event monitor 250, the task extraction component 260, and/or the task completion detector 270. The data may be received (or accessed), and optionally accumulated, reformatted, and/or combined, by user-data collection component 210 and stored in one or more data stores such as storage 225, where it may be available to other components of system 200. For example, the user data may be stored in or associated with a user profile 240, as described herein. In some embodiments, any personally identifying data (for example, user data that specifically identifies particular users) is either not uploaded or otherwise provided from the one or more data sources with user data, is not permanently stored, and/or is not made available to the components or subcomponents of system 200. In some embodiments, a user may opt into or out of services provided by the technologies described herein and/or select which user data and/or which sources of user data are to be utilized by these technologies.

User data may be received from a variety of sources where the data may be available in a variety of formats. For example, in some embodiments, user data received via user-data collection component 210 may be determined via one or more sensors, which may be on or associated with one or more user devices (such as user device 102a), servers (such as server 106), and/or other computing devices. As used herein, a sensor may include a function, routine, component, or combination thereof for sensing, detecting, or otherwise obtaining information such as user data from a data source 104a, and may be embodied as hardware, software, or both. By way of example and not limitation, user data may include data that is sensed or determined from one or more sensors (referred to herein as sensor data), such as location information of mobile device(s), properties or characteristics of the user device(s) (such as device state, charging data, date/time, or other information derived from a user device such as a mobile device), user-activity information (for example: app usage; online activity; searches; voice data such as automatic speech recognition; activity logs; communications data including calls, texts, instant messages, and emails; website posts; other user data associated with communication events) including, in some embodiments, user activity that occurs over more than one user device, user history, session logs, application data, contacts data, calendar and schedule data, notification data, social-network data, news (including popular or trending items on search engines or social networks), online gaming data, ecommerce activity (including data from online accounts such as Microsoft®, Amazon.com®, Google®, eBay®, PayPal®, video-streaming services, gaming services, or Xbox Live®), user-account(s) data (which may include data from user preferences or settings associated with a personal assistant application or service), home-sensor data, appliance data, GPS data, vehicle signal data, traffic data, weather data (including forecasts), wearable device data, other user device data (which may include device settings, profiles, network-related information (e.g., network name or ID, domain information, workgroup information, connection data, Wi-Fi network data, or configuration data, data regarding the model number, firmware, or equipment, device pairings, such as where a user has a mobile phone paired with a Bluetooth headset, for example, or other network-related information)), gyroscope data, accelerometer data, payment or credit card usage data (which may include information from a user's PayPal account), purchase history data (such as information from a user's Xbox Live, Amazon.com, or eBay account), other sensor data that may be sensed or otherwise detected by a sensor (or other detector) component(s) including data derived from a sensor component associated with the user (including location, motion, orientation, position, user-access, user-activity, network-access, user-device-charging, or other data that is capable of being provided by one or more sensor components), data derived based on other data (for example, location data that can be derived from Wi-Fi, Cellular network, or IP address data), and nearly any other source of data that may be sensed or determined as described herein.

User data can be received by user-data collection component 210 from one or more sensors and/or computing devices associated with a user. While it is contemplated that the user data may be processed, for example by the sensors or other components not shown, for interpretability by user-data collection component 210, embodiments described herein do not limit the user data to processed data and may include raw data. In some embodiments, user-data collection component 210 or other components of system 200 may determine interpretive data from received user data. Interpretive data corresponds to data utilized by the components of system 200 to interpret user data. For example, interpretive data can be used to provide context to user data, which can support determinations or inferences made by the components or subcomponents of system 200, such as venue information from a location, a text corpus from user speech (for example, speech-to-text), or aspects of spoken language understanding. Moreover, it is contemplated that for some embodiments, the components or subcomponents of system 200 may use user data and/or user data in combination with interpretive data for carrying out the objectives of the subcomponents described herein.

In some respects, user data may be provided in user-data streams or signals. A "user signal" or "signal" can be a feed or stream of user data from a corresponding data source (e.g., a particular email service). For instance, a user signal could be natural language text derived from a smartphone, a home-sensor device, a smart speaker, a GPS device (e.g., for location coordinates), a vehicle-sensor device, a wearable device, a user device, a gyroscope sensor, an accelerometer sensor, a calendar service, an email account, a credit card account, or other data source. In some embodiments, user-data collection component 210 receives or accesses user-related data continuously, periodically, as it becomes available, or as needed. In some embodiments, such user data is used by the pruning component to monitor only those signals that are likely to include indications of task completion, as described in more detail below.

Continuing with FIG. 2, example system 200 includes an event monitor 250. Event monitor 250 is generally responsible for detecting and/or monitoring events (e.g., an audio-conducted meeting, written natural language content and/or activity) from one or more sources (e.g., an email thread or a sensor). In some embodiments, the event monitor 250 monitors these events for particular indications, such as a meeting location (e.g., as determined by geo-location of user devices), topic of a meeting (e.g., as detected in an email), invitees of the meeting, whether the meeting is recurring, related deadlines, projects, and the like. In some aspects, the events monitored by the event monitor 250 may be a past (or historic) events (e.g., an old email thread) or a current event (e.g., a new email). Further, it should be appreciated that the event monitor 250 may be responsible for monitoring any number of events, for example, each online meeting associated with the system 200.

In some embodiments, the input into the event monitor 250 is sensor data and/or user device data of one or more users and/or contextual information from a meeting invite and/or email or other device activity of users at the meeting. In some embodiments, this includes user data collected by the user-data collection component 210 (which can be accessible via the user profile 240).

The event activity monitor 252 monitors user activity via one or more sensors, (e.g., microphones, video), devices, chats, presented content, and the like. In some embodiments, the event activity monitor 252 outputs natural language transcripts or activity that happens during a meeting or other event. For example, activity or content may be timestamped or otherwise correlated with meeting transcripts. In an illustrative example, the event activity monitor 252 may indicate a clock time at which the meeting begins and ends. In some embodiments, the event activity monitor 252 monitors user activity information from multiple user devices associated with the user and/or from cloud-based services associated with the user (such as email, calendars, social media, or similar information sources), and which may include contextual information associated with transcripts or content of an event. For example, an email may detail conversations between two participants that provide context to a meeting transcript by describing details of the meeting, such as purpose of the meeting. The event activity monitor 252 may determine current or near-real-time user activity information and may also determine historical user activity information, in some embodiments, which may be determined based on gathering observations of user activity over time and/or accessing user logs of past activity (such as browsing history, for example). Further, in some embodiments, the event activity monitor 252 may determine user activity (which may include historical activity) from other similar users (for example, crowdsourcing).

In some embodiments, event activity monitor 252 monitors user data associated with the user devices and other related information on a user device, across multiple computing devices (e.g., associated with all participants in a meeting), or in the cloud. Information about the user's devices may be determined from the user data made available via user-data collection component 210 and may be provided to the task extraction component 260 and/or the task completion detector 270, among other components of system 200, to make predictions of whether character sequences or other content is a task or indication of completion of such task. In some implementations of event activity monitor 252, a user device may be identified by detecting and analyzing characteristics of the user device, such as device hardware, software such as OS, network-related characteristics, user accounts accessed via the device, and similar characteristics, as described above. For example, information about a user device may be determined using functionality of many operating systems to provide information about the hardware, OS version, network connection information, installed application, or the like. Similarly, some embodiments of event activity monitor 252, or its subcomponents, may determine a device name or identification (device ID) for each device associated with a user.

In embodiments, using contextual information related to user devices, a user device may be identified by the event activity monitor 252 by detecting and analyzing characteristics of the user device, such as device hardware, software such as OS, network-related characteristics, user accounts accessed via the device, and similar characteristics. For example, as described previously, information about a user device may be determined using functionality of many operating systems to provide information about the hardware, OS version, network connection information, installed application, or the like. In some embodiments, a device name or identification (device ID) may be determined for each device associated with a user. This information about the identified user devices associated with a user may be stored in a user profile associated with the user, such as in user account(s) and device(s) 246 of user profile 240. In an embodiment, the user devices may be polled, interrogated, or otherwise analyzed to determine contextual information about or signals from the devices. This information may be used for determining a label or identification of the device (e.g., a device ID) so that user activity on one user device may be recognized and distinguished from user activity on another user device. Further, as described previously, in some embodiments, users may declare or register a user device, such as by logging into an account via the device, installing an application on the device, connecting to an online service that interrogates the device, or otherwise providing information about the device to an application or service. In some embodiments, devices that sign into an account associated with the user, such as a Microsoft® account or Net Passport, email account, social network, or the like, are identified and determined to be associated with the user. In this way, for example, users can be identified for candidate task assignment, as described in more detail below.

The contextual information determiner 254 determines contextual information about an event. This information may be metadata or other data that is not the actual natural language content or payload itself, but describes related information. For example, contextual information may include who is present or invited to a meeting, the topic of the meeting or email, whether the meeting is recurring or not recurring, the location of the meeting, the date of the meeting or email, the relationship between other projects or other meetings, information about invited or actual attendees of the meeting (e.g., company role, whether participants are from the same company, and the like). "Event context" can comprise or include one or more portions (e.g., sentences or time sequences) of an audio or written transcript of all (or some of the) dialogue or utterances (e.g., conversations, questions, laughing, action items, etc.) within an event. This represents the actual event content. Accordingly, for instance, for the task "I will do it," the sentence right before this phrase in a transcript may have been, "John, will you be able to meet the model design deadline?" This event context contextual data provides a strong inference that John is the speaker and person responsible for the "I will do it" task and that the "it" refers to the due date of the task. Using this same illustration, a sentence directly after the task candidate in a transcript may be, "ok good, I look forward to hearing about it next Friday." This context may indicate that "next Friday" is the due date of the model design task candidate. Subsequently, in some embodiments, a user interface or other graphically displayed format may indicate the task candidate and/or tags that indicate who is saying/receiving the action item candidate, when the due date is, and/or what the candidate task is. For example, using the illustration above, the final displayed task may be, "[John] will [finish the model design by next Friday]." In this way, the finally presented candidate task can add, remove, replace, or otherwise change originally presented action item candidates with other character sequences.

Additionally or alternatively, contextual data can refer to any remote or "external context" obtained, which is not directly part of the transcript or natural language content of the actual event (the event context). For example, external context can be data retrieved from a user device (e.g., via a calendaring tool plugin, text, social media, or other application), sensor (e.g., biometric sensor, geolocation sensor, etc.), one or more servers, and/or other remote data stores, such as a database. Such external context can be used as one or more signals to determine information such as the date the candidate task is due, who is speaking, who the candidate task is to be completed by, and/or to clarify what the candidate task specifically is. In an illustration, using the example above, for an event transcript that includes the candidate task, "I will do it," the event context may not indicate who said this, but a text message from a meeting participant's phone may read, "John, we are having a meeting in 1 week to discuss the model design that you are responsible for, can you be there?" This external context can be a strong signal that the owner and speaker of the task candidate is John.

The content assembler 256 is generally responsible for receiving event content and related contextual information and generates an enriched activity timeline. In some embodiments, this timeline is a transcript that includes tags and/or other associated content. For example, the timeline can include structured data (e.g., a database) that includes records, where each record includes the timeline of each conversation and a timestamp indicating when the conversation started/stopped. The record can alternatively or additionally include contextual information, such as information about participants of the event or the event itself (e.g., topic of the event, files, slides, or any information in the user profile 240). The enriched activity timeline can be the output of the event monitor 250.

The user profile 240 may include learned information about users (e.g., participants or meeting attendees), personal preferences of users, and the like. In an illustrative example, the user profile 240 may include user activity information 242. This may include indications of when attendees or speakers tend to mention tasks (e.g., that is identified via patterns in prior meetings) or complete tasks. For example, a particular attendee may always state tasks during the last 5 minutes of a meeting. This information can be used to make predictions throughout a meeting to determine whether or not statements are tasks. The user profile 240 may also include how attendees or speakers mention action items. For example, historical meeting events may indicate that a particular user always states "let's mark it,"

after the end of each task to make sure tasks are marked as important in notes otherwise for completion.

The user profile 240 can include user preferences 244, which generally include user settings or preferences associated with event monitor 250. By way of example and not limitation, such events may include user preferences about specific events (and related information) that the user desires to be explicitly monitored or not monitored or categories of events to be monitored or not monitored, crowdsourcing preferences, such as whether to use crowdsourced information, or whether the user's event information may be shared as crowdsourcing data; preferences about which events consumers may consume the user's event pattern information; and thresholds, and/or notification preferences, as described herein.

The task extraction component 260 is generally responsible for detecting, from natural language content, a candidate task. In some embodiments, the input to the task extraction component 260 includes the output of the event monitor 250 (e.g., user data and meeting-related data from sensors (microphones, video, user activity, and the like)), the user-data collection component 210, and/or from user profile 240 of users. In some embodiments, the output of the task extraction component 260 is a list of likely or candidate tasks and related corresponding information, such as relevant files, who the candidate task is attributed to or who has to complete the candidate task, the date, and the like. In some embodiments, the output of the a task extraction component 260 is a structured data record (e.g., a database record) that includes various attributes, such as a candidate task name, attribution (who has to complete the candidate task), candidate task category/type, related files, and/or content to be provided to remind the user to complete an action item.

In some embodiments, the task extraction component 260 structures or cleans natural language content (e.g., the transcription and contextual data). For example, a sentence can be tagged with Part-Of-Speech (POS) identifiers, words can be removed, replaced, and added. In an illustrative example, Natural Language Processing (NLP) techniques can be performed to replace certain words or phrases. For instance, the phrase "I am going to expect you to finish project X," can be restructured as "person will finish project X." NLP techniques are described in more detail below.

In some embodiments, the task extraction component 260 can determine candidates based on the syntax or other structure of content (e.g., whether a sentence is a command). In some embodiments, the task extraction component 260 excludes content or task candidates based on candidates that will likely be finished during the meeting or that are private commands or requests unrelated or are not part of an event. For example, the statement "I will finish talking about X in the next slide," may be excluded as a task because it is likely to be finished during a meeting. In some embodiments, the task extraction component 260 identifies linguistic or natural breaks in the content, such as periods, semi-colons, when commands are issued, and the like to determine that the content between these characters or commands are candidates for further processing. For example, if event content had a total of 4 sentences, and 3 of the 4 sentences were commands, the task extraction component identifies the 3 sentence commands as individual task candidates for further processing.

In some embodiments, the task extraction component 260 classifies a task candidate as either a candidate task or not a candidate task. In some embodiments, the task extraction component 260 classifies tasks based at least in part on the information retrieved by the event monitor 250, and/or the information in the user profile 240. For example, the task extraction component 260 can receive contextual information from the contextual information determiner 254 that indicates the due date X of candidate task Y discussed prior to a current meeting. Then during a current meeting, managing participant John Doe may say, "okay, let's start doing Y beginning tomorrow." The task extraction component 260 may then predict that Y is the candidate task based on the manager being the speaker and prior information that indicated Y being an action item and having a due date.

In some embodiments, the task extraction component 260 uses one or more machine learning models, such as a deep learning classification neural network (e.g., a Convolutional Neural Network (CNN), Recurrent Neural Network (RNN), or Transformers). In certain embodiments, labels, categories, or target classifications can first be identified, such as "candidate task" or "not candidate task." These labels, categories, or target classifications may either be hard (e.g., membership of a class is a binary "yes" or "no") or soft (e.g., there is a probability or likelihood attached to the labels). Alternatively or additionally, transfer learning may occur. Transfer learning is the concept of re-utilizing a pre-trained model for a new related problem. For example, confidence levels obtained to detect tasks can be used to detect non-tasks. A new dataset is typically similar to original data set used for pre-training. Accordingly, the same weights can be used for extracting the features from the new dataset. In an illustrative example, an original data set may include a statement made by a meeting participant that is classified as a candidate task. It may also be the case that the participant makes this statement 95% of the time when issuing a candidate task. Accordingly, via transfer learning and for a new incoming data set, the user may not make this statement. Using the same weights, it can be inferred that the statement is not a candidate task.

In some embodiments, the task extraction component 260 determines attribution or to whom task candidates are attributed. For example, the task extraction component 260 can determine the person responsible for completing the candidate task and/or the person that stated the candidate task. In some embodiments, the attribution may be based on information obtained by the event monitor 250, information in the user profile 240, and/or classification made by the task extraction component 260. For example, some statements made during meetings or other events are incomplete or otherwise unclear as to the rest of the context. Accordingly, the task extraction component 260 can use this outside contextual information as signals to attribute candidate tasks. For instance, a statement in a meeting may be, "okay go do X starting tomorrow." From this statement alone it may be unclear who is talking and who is supposed to be performing X starting tomorrow. However, contextual information obtained from a chat prior to the meeting by the event monitor 250 may indicate that Jane Doe was supposed to perform X and that Alexis, her boss, would tell her during the meeting when to complete X. Accordingly, Alexis may be the owner of the candidate task and thus the candidate task can be attributed to her.

The task extraction component 260 can map content character sequences to the identity of the speaker or person responsible for completing the candidate task in any suitable manner. For example, in some embodiments, a voice-recognition component can be used on audio content input to map phonemes of the input to a library of known or predetermined phonemes of particular users (e.g., as found within the user activity information 242). Accordingly, a voice-recognition component can record each user's voice in the user profile 240 (e.g., each user that can potentially attend a meeting). In this way, a prediction can be made that a particular parsed character sequence was said by a particular user. Alternatively or additionally, the mapping or association can include a written transcript with a person's name or other identifier next to each character sequence. In an illustrative example, the task extraction component 260 can take as input, a written transcription of a meeting. The sentence, "we need to finish the draft by Friday" may be tokenized to individual words where the subject of the sentence is tagged (e.g., we), the verb of the sentence is tagged (e.g., finish), and the object of the sentence is identified (e.g., draft), as well as semantic context, such as "action item draft to be finished by Friday," as well as indicating that John, the manager said this.

In some embodiments, the task extraction component 260 performs deduplication of action items, consolidates candidate tasks, and/or verifies consistency among candidate tasks. Deduplication of candidate tasks may include removing redundant or repetitively stated candidate tasks. For example, the action item, "Get Y done by Friday" may be stated twice in a meeting and so one of the statements may be removed. Verifying consistency and consolidation may include combining differently stated versions of the same candidate task. For example, a first candidate task may be "Rex, let's perform project Y." A second candidate task may state "so yes . . . let's keeping plugging away to get project Y done." These two candidate tasks may be consolidated into one candidate task that is transformed in a manner that is consistent with both statements, such as "Rex will perform project Y."

In some embodiments, the task extraction component 260 generates a list of candidate tasks and may also provide related information. For example, such related information may be the attributed persons(s), due dates of candidate tasks, files, project names, timestamps of different conversations, who is speaking, the owner of the candidate task, and the like. In some embodiments, the related information may be obtained from the contextual information obtained by the event monitor 250.

The task completion detector 270 is generally responsible for detecting one or more indications of completion for one or more candidate tasks. In various embodiments, such detection is based on the task-reply pre-training component 271, the knowledge distillation component 272, the task-reply fine-tuning component 274, the pruning component 276, and/or the task completion predictor 268.

In some embodiments, the task-reply pre-training component 271 and task-reply fine-tuning component 274 indicate how pre-training and fine-tuning can be performed via an encoder (or set of encoders), according to some embodiments. In some embodiments, pre-training is performed to understand language and fine-tuning is performed to learn a specific task, such as learning an answer to a set of questions or learning the specific relationships between tasks and indications of completions for those tasks.

In some embodiments, an encoder (e.g., the encoder 406 of FIG. 4) learns what language and context for a word is in pre-training by training on two unsupervised tasks—MLM and NSP—simultaneously or at the same time. For MLM, the encoder takes in a sentence, block, or line, with random words being replaced with masks. The goal is to output the value or meaning of the masked tokens. For example, if a line reads, "please [MASK] this document promptly," the prediction for the "mask" value is "send." This helps the encoder understand the bidirectional context in a sentence, line, or block. In the case of NSP, the encoder takes, as input, two or more elements, such as sentences, lines, or paragraphs and determines, for example, if a second line in a chat thread actually follows (is directly below) the first chat thread on a chat page. This helps the encoder understand the context across all the elements of a document, not just within a single element. Using both of these together, the encoder derives a good understanding of language.

In some embodiments, during pre-training, the input to the encoder is a set (e.g., 2) of masked lines (lines for which there are one or more masks), which could alternatively be blocks or sentences. Each word is represented as a token, and some of the tokens, are masked. Each token is then converted into a word embedding (e.g., the output of 404 of FIG. 4). At the output side is the binary output for the next sentence prediction. For example, this component may output 1, for example, if masked line 2 followed (e.g., was directly beneath) masked block 1. The "T" values (are word feature vectors that correspond to the outputs for the MLM functionality. Thus, the number of word feature vectors that are input is the same number of word feature vectors that are output.

In some embodiments, the initial embedding (e.g., the input embedding 402) used by the task-reply pre-training component is constructed from three vectors—the token embeddings, the segment or context-question embeddings, and the position embeddings. In some embodiments, the following functionality occurs in the pre-training phase. The token embeddings are the pre-trained embeddings. The segment embeddings are the block or line number (e.g., that a candidate task or candidate indication for completion is in) that is encoded into a vector. This is different than regular BERT models, which encode a sentence number, for example. However, tasks and indications of completion tend to be embedded in particular lines in emails or chat threads so this information is more useful than sentence numbers. The position embeddings are vectors that represent the position of a particular word in such block or line (e.g., as described with respect to the component 404 of FIG. 4). When these three embeddings are added or concatenated together, an embedding vector is generated that is used as input into the encoder. The segment and position embeddings are used for temporal ordering since all of the vectors are fed into the encoder simultaneously and language models need some sort of order preserved. In the fine-tuning phase, and at inference time, the segment vectors can become question-answer embeddings in some embodiments.

In pre-training, the output is typically a binary value C (for NSP) and various word vectors (for MLM). With training, a loss (e.g., cross entropy loss) is minimized. In some embodiments, all the feature vectors are of the same size and are generated simultaneously. As such, each word vector can be passed to a fully connected layered output with the same number of neurons equal to the same number of tokens in the vocabulary.

In some embodiments, the task-reply pre-training component 271 additionally or alternatively pre-trains on generic task-reply pairs (as opposed to merely learning language) from different data sources as done in standard BERT models. More specifically, the task-reply pre-training component 271 can learn, via training, the relationship between requests and replies. In some embodiments, a "task" in a task-reply context refers to a candidate task as detected by the task extraction component 260. In some embodiments, a "reply" in a task-reply context refers to the particular correct indication or natural language sequence indicating completion of such candidate task. In some embodiments, such task-reply functionality is expressed though Question Answering (QA) systems. In other words, the task-reply pairs can be question-answer pairs. In QA tasks, models receive a question regarding text content (e.g., "can you send me the file?") and mark or tag the beginning and end of the answer (e.g., "here is the file.") in a document. Embodiments can use QA functionality to determine if candidate tasks (e.g., questions) have been completed (e.g., answered). With training, a loss (e.g., cross entropy loss) is minimized such that the correct "reply" is eventually paired with the request after training.

The task-reply fine-tuning component 274 is generally responsible for fine tuning the encoder after it has been pre-trained via the task-reply pre-training component 271. Once pre-training is performed via the task-reply pre-training component 271, the encoder can be trained on very specific tasks, such as Question Answering, on specific software applications or for specific users (e.g., a business unit's conversations on MICROSOFT TEAMS). For example, in Question Answering, some embodiments replace the fully connected output layers of the encoder using in pre-training, with a fresh set of output layers that can output the answer to a given question. Subsequently, supervised training can be performed using a Question Answering dataset. Accordingly the task-reply fine-tuning component 274 can change the model for fine-tuning by changing the input layer and the output layer. That is, for example, the inputs are changed from the masked line 1 and 2 tokens to a "question" and "block" that contains an answer (or candidate answer) as the tokens. In the output layer, certain embodiments output the start and end words (or characters) that encapsulates the answer. In some embodiments, such question-answer or task-reply pairs are specifically labeled as completed or not completed. Such labelling and optimizing a loss are described in more detail below.

The knowledge distillation component 272 is generally responsible for using compression techniques to compress a first version of a machine learning model into a smaller second version of the machine learning model. In this way, a task-reply pre-training component 271 and/or the task-reply fine-tuning component 274 can learn natural language and context, where the task-reply fine-tuning component 274's dataset used for distillation is much larger than the training data we used to train the teacher. For example, knowledge distillation can be performed during pre-training in order to reduce the size of an existing BERT model by 40%, while retaining 97% of its language understanding capabilities and being 60% faster than BERT. In other words, it is possible to reach similar performances on particular downstream tasks using much smaller language models pre-trained with knowledge distillation but with larger training data, resulting in models that are lighter and faster at inference or prediction time, while also requiring a smaller computational training budget. Such compression techniques can be, for example, knowledge distillation. Knowledge distillation is a compression technique in which a compact model—the student—is trained to reproduce the behavior of a larger model—the teacher—or an ensemble of models. In supervised learning, a classification model is generally trained to predict an instance class by maximizing the estimated probability of gold labels. A standard training objective thus involves minimizing the cross-entropy between the model's predicted distribution and the one-hot empirical distribution of training labels. A model performing well on the training set will predict an output distribution with high probability on the correct class and with near-zero probabilities on other classes. But some of these "near-zero" probabilities are larger than others and reflect, in part, the generalization capabilities of the model and how well it will perform on the test set.

In some embodiments, for training loss, the student is trained with a distillation loss over the soft target probabilities of the teacher:

$$L_{ce} = \Sigma_i t_i * \log(s_i)$$

where $t_i$ (resp. $s_i$) is a probability estimated by the teacher (resp. the student). This objective results in a rich training signal by leveraging the full teacher distribution. In some embodiments, a softmax-temperature is used:

$$p_i = \frac{\exp(z_i/T)}{\sum_j \exp(z_j/T)}$$

where T controls the smoothness of the output distribution and $z_i$ is the model score for the class i. The same temperature T is applied to the student and the teacher at training time, while at inference, T is set to 1 to recover a standard softmax. The final training objective is a linear combination of the distillation loss $L_{ce}$ with the supervised training loss, which can be the masked language modeling loss $L_{mlm}$. Some embodiments add a cosine embedding loss ($L_{cos}$), which will tend to align the directions of the student and teacher hidden states vectors. In some embodiments, the task-reply fine-tuning component 274 additionally fine tunes the model after knowledge has been distilled via the knowledge distillation component 272, as described in more detail below.

The pruning component 276 is generally responsible for monitoring one or more objects for signals that are most likely to indicate a completion of a task. As described herein, this saves on computing resources (e.g., I/O, network header generation costs, etc.) so that a large universe of objects do not have to be monitored for corresponding signals. Specifically, the pruning component 276 can determine that a subset of signals, of a plurality of signals, are likely to include an indication of completion of a candidate task based on what the candidate task is. A "signal" or "user signal" described herein can refer to a particular word (or set of words), a particular application, or particular object, such as a file. For example, a candidate task may be, "email me the file." Based on the words "email me," the pruning component 276 can determine that a user's email application and account (a signal) will likely include the indication of completion for this candidate task. And based on this determination, the pruning component 276 can monitor one or more objects for the subset of signals. In other words, the pruning component 276 can listen for only the subset of signals (e.g., a message in an email application and account) and no other signals (e.g., conversations of a telecommunications channel, or messages in a chat room, etc.) based on the content of the candidate task. An "object" in this context can be or include a computing device, such as a user device, a particular application (e.g., a chat application, an email application), or any suitable communication channel (e.g., a telecommunications channel or SMS text channel).

In some embodiments, the pruning component 276 additionally or alternatively prunes a data structure (e.g., a decision tree or graph) that indicates a plurality of signals based on determining that the subset of signals are likely to include the indication of completion of the candidate task. In some embodiments, the pruning includes removing a portion of the data structure that does not represent the subset of signals. For example, in a graph structure or a decision tree, nodes representing signals that are not the subset likely to include an indication of completion can be removed so that they are not traversed in order to listen to corresponding objects and signals. In some embodiments, pruning is a data compression technique in search algorithms that reduces the size of decision trees by removing sections of the tree that are non-critical and redundant to classify instances. For example, before the pruning component 276 monitors objects to listen for any signal, it may perform a search or "walk" on the decision tree to determine which objects to poll or signals to monitor for. If, however, the pruning component 276 determines that particular signals are not likely to include the indication of completion, the corresponding nodes and edges are not traversed so that the monitoring can occur much faster and bandwidth resources can be saved by the pruning component 276 only monitoring for a subset of signals in parallel, as opposed to a larger pool of signals.

The task completion predictor 268 is generally responsible for generating inferences or predictions at deployment for particular natural language words that are candidates that indicate that a particular task has been completed. In other words, after a model (e.g., a BERT model) has been trained and distilled via the components 271, 272, and 274, it can predict whether a natural language sequence is an indication that a candidate task has been completed. For example, subsequent to the pruning component 276 monitoring a subset of signals (e.g., chat thread messages) for task completion, the task completion predictor 268 may receive a user-inputted natural language sentence of "I just sent you the document." And based on the training of the model, the task completion predictor 268 can predict that this sentence indicates that the task of "John, send me charting document tomorrow" has been completed (e.g., based on the input(s) 401 described with respect to FIG. 4). For example, the task completion predictor 268 can convert the natural language sentence (and other contextual input) into a first feature vector in feature space and compare against trained word embeddings or second feature vectors that represent individual task candidates and then compute a distance between the feature vectors. If the distance (e.g., Euclidian or Cosine) meets or is within a threshold, then the candidate natural language sentence can be marked as an indication that the corresponding candidate task has been completed.

Example system 200 also includes a presentation component 220 that is generally responsible for presenting content and related information to a user, such as the content related to indications of whether a candidate task has been completed. Presentation component 220 may comprise one or more applications or services on a user device, across multiple user devices, or in the cloud. For example, in one embodiment, presentation component 220 manages the presentation of content to a user across multiple user devices associated with that user. Based on content logic, device features, associated logical hubs, inferred logical location of the user, and/or other user data, presentation component 220 may determine on which user device(s) content is presented, as well as the context of the presentation, such as how (or in what format and how much content, which can be dependent on the user device or context) it is presented and/or when it is presented. In particular, in some embodiments, presentation component 220 applies content logic to device features, associated logical hubs, inferred logical locations, or sensed user data to determine aspects of content presentation. For instance, clarification and/or feedback request can be presented to a user via presentation component 220.

In some embodiments, presentation component 220 generates user interface features. Such features can include interface elements (such as graphics buttons, sliders, menus, audio prompts, alerts, alarms, vibrations, pop-up windows, notification-bar or status-bar items, in-app notifications, or other similar features for interfacing with a user), queries, and prompts.

In some embodiments, a personal assistant service or application operating in conjunction with presentation component 220 determines when and how (e.g., presenting only candidate tasks or candidate tasks with metadata, as opposed to an entire meeting transcript) to present the content. In such embodiments, the content, including content logic, may be understood as a recommendation to the presentation component 220 (and/or personal assistant service or application) for when and how to present the notification, which may be overridden by the personal assistant app or presentation component 220.

Example system 200 also includes storage 225. Storage 225 generally stores information including data, computer instructions (e.g., software program instructions, routines, or services), and/or models (e.g., machine learning models) used in embodiments of the technologies described herein. In an embodiment, storage 225 comprises a data store (or computer data memory). Further, although depicted as a single data store component, storage 225 may be embodied as one or more data stores or may be in the cloud.

Figure 3:
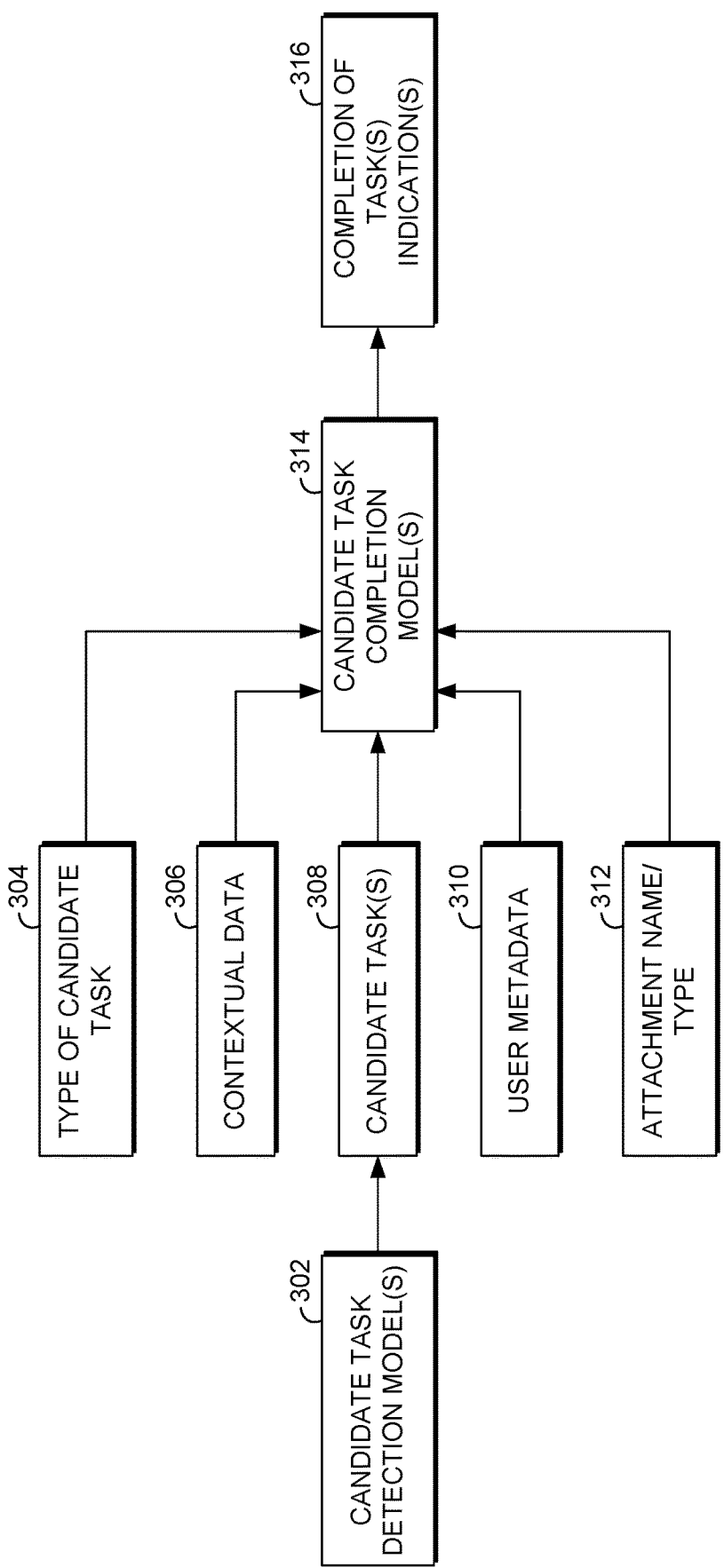
FIG. 3 is a schematic diagram illustrating how multiple models work together and the particular inputs used to generate an indication of one or more task completions, according to some embodiments of this disclosure.

FIG. 3 is a schematic diagram illustrating how multiple models work together and the particular inputs used to generate an indication of one or more task completions, according to some embodiments. The one or more candidate task detection models 302 are generally responsible for detecting one or more candidate tasks.

In some embodiments, the candidate task detection model(s) 302 classifies sections (e.g., tasks, paragraphs, sentences, pages, and the like) of content as concrete (high probability that the section is a task) or descriptive (low probability that the section is a task). The task detection model(s) 302 thus parses content and maps, in memory, the sections as likely or not likely to be tasks (e.g., based on syntax structure). For example, sentences or phrases without any commands or requests (e.g., sentences that are not imperative sentences), such as "item X was great for our customers," or "we had lots of fun at the last meeting," or "we made lots of progress since the last meeting," have a low probability of being tasks. Conversely, sentences or phrases that are imperative sentences or otherwise include commands or requests are more likely to be tasks. An imperative sentence is used to issue a command, make a request, or offer advice. Imperative sentences typically end in a period or exclamation point or have other syntactic properties, such as a subject, followed by a verb, then an object (e.g., "John [subject], please join [verb] in on the project [object]"). In some embodiments, the candidate task detection model(s) can discern between tasks and those that appear to be tasks but are not based, for example, on syntactic properties and or history (e.g., the participant behavior history). For example, the statement, "you can press on it," may be tagged as not a task based on a dictionary or other data structure that lists colloquial terms or phrases that are sayings, as opposed to tasks.

In some embodiments, the candidate task detection model(s) 302 uses prediction models, such as a Hidden Markov Model (HMM). An HMM is a computing tool for representing probability distributions over sequences of observations. These tools model time series data. HMMs augment the Markov chain. The Markov chain is a model that provides insight about the probabilities of sequences of random variables, or states, each of which take on values from a set of data. These data sets can be words, tags, symbols, or the like. The assumption with Markov chains is that any prediction is based only on the current state, as opposed to states before the current state. States before the current state have no impact on the future state. In various cases, events of interest are hidden in that they cannot be observed directly. For example, POS tags or tasks candidates are typically not directly observed in a text. Rather, words themselves are directly observed, and POS tags (the hidden state) or candidate tasks are inferred.

In some embodiments, the candidate task detection model(s) 302 takes, as input, all the calculated features obtained by the event monitor 250, and classifies or otherwise makes a prediction whether each candidate task is a task or is not a task. In some embodiments, "context" as described herein is the surrounding text of a particular character sequence. For example, a context of a first sentence can be a second sentence that is before the first sentence and a third sentence after the first sentence.

In an illustrative example of how the candidate task detection model(s) 302 makes predictions, first a NLP module can take as input an entire transcript to restructure the transcript as described above. Responsively, the candidate task detection model(s) can identify candidate tasks based on sentence syntax, exclusion rules, and/or can extract various features from the user profile 240 and data monitored from the event monitor 250, as described above. Responsively, the candidate task detection model(s) 302 can determine the probability that sections or task candidates in the transcript are tasks or not (e.g., via an HMM), and then finally classify whether a candidate task is indeed a candidate. For example, the candidate task detection model(s) 302 can determine whether or not a candidate is a task with a certain level of confidence based at least in part on the context surrounding the candidate task, the user profile 240 and/or the information monitored by the event monitor 250.

In some embodiments, the candidate task detection model(s) 302 uses a machine learning model, such as a deep learning classification neural network (e.g., a CNN). With CNNs, labels, categories, or target classifications can first be identified, such as "task" or "no task." The neural network can include a convolutional layer, a pooling layer, and a fully connected layer. Each input can be transformed into a 2-D input vector array of values, such as integers of ones and zeroes. Each value represents or describes a particular value of the input and the value's intensity. For instance, a word or character sequence can be denoted with a one, and other words or character sequences can be denoted with zeroes. The convolutional layer utilizes one or more filter maps, which each represent a feature of the input. There may be various features of the input, and thus there may be various linearly stacked filter maps for a given input. A filter map is also an array of values that represent sets of values and weights where a value is weighted higher when it matches a corresponding value (e.g., training data that indicates participant behavior history) or set of values in the corresponding section of the input. The convolution layer includes an algorithm that uses each filter map to scan or analyze each portion of the input. Accordingly, each value of each filter map is compared and matched up against a corresponding value in each section of the input and weighted according to similarity. In some embodiments, the convolutional layer performs linear functions or operations to arrive at the filter map by multiplying each value with its own value and then performing a summation function of each product, which is then divided by the total quantity of values in the input feature.

In particular embodiments, the pooling layer reduces the dimensionality or compresses each feature map by picking a window size (for example, a quantity of dimensional values that will be analyzed in the feature map) and selecting the maximum value of all of the values in the feature map as the only output for the modified feature map. In some embodiments, the fully connected layer maps or votes for each value of each modified feature to each classification (for example, whether or not the candidate is a "candidate task" or "not a candidate task"). The vote strength of each value is based on its weight or value score. The output is a score (e.g., a floating point value, where 1 is a 100% match) that indicates the probability that a given input or set of modified features fits within a particular defined class (is an "task" or "not a task"). For example, an input may include a set of text that states, "let's get this meeting started after I tell a joke . . . . Jake tell John to finish the product by Monday." The classification types may be "task" or "not a task." After the first character sequence "let's get this meeting started after I tell a joke . . . " is fed through each of the layers, the output may include a floating point value score for each classification type that indicates "task: 0.21," and "not a task: 0.90," which indicates that this character sequence has a 90% probability of not being a task. Training or tuning can include minimizing a loss function between the target variable or output (e.g., 0.90) and the expected output (e.g., 100%). Accordingly, it may be desirable to arrive as close to 100% confidence of a particular classification as possible so as to reduce the prediction error. This may happen over time as more training inputs and baseline data sets are fed into the learning models so that classification can occur with higher prediction probabilities.

The output of the candidate task detection model(s) 302 is the one or more candidate tasks 308, which is used as input for the candidate task completion model(s) 314. The candidate task completion model(s) 314 additionally uses other features as input, such as a type of candidate task, contextual data 306, user metadata 310, and attachment name/type 312.

In some embodiments, the type of candidate task input 304 is indicative of whether the candidate task is a request or commitment. A "request" typically includes a question or command directed toward a person. For example, a request can be, "can you send me the file?" A "commitment" typically indicates an assent or commitment to perform some action associated with the request. For example, using the illustration above, a user may say, "yes, I'll send you the file tomorrow." In some embodiments, the type of candidate task input 304 additionally or alternatively refers to tagging natural language content with a category that the candidate task belongs to (e.g., via NLP or lookup table). For example, a candidate task may be "send me the file," and the type of candidate task may be "request for file." In another example, a candidate task may be, "can you tell me whether we are over budget or not for the year?" The candidate task type may be "a request for information." Such tagging of type or category may be used by particular embodiments to determine which signals to listen for. For example, if the type of candidate task is a request to send a file, particular embodiments can then listen to an email account to look for whether a particular file name or type is being sent by a user (even if the user provides no natural language content) in order to detect completion of the task.

The contextual data input 306 refers to event context (e.g., words or sentences before/after a detected indication of a candidate task on a same thread) and/or external context (e.g., words or sentences detected on other platforms or channels, such as SMS text, email, etc.), as describe with respect to the contextual information determiner 254. In some embodiments, the contextual data input 306 is derived from the user-data collection component 210, the event monitor 250, and/or the user profile 240.

The user metadata input 310 refers to any metadata associated with one or more users. For example, the user metadata input 310 can include the user or speaker who uttered/typed text that indicates the candidate task, the user or speaker who is assigned completion of the candidate task as described, and the like. Some embodiments use NLP other the contextual data 306 to determine who is assigned completion of the candidate task even though this may not be explicit. For example, Rod may mention in a thread of a private group of people, "I need to have the project ready by next month." Shortly thereafter, Alex may say, "sure, I'll volunteer to do it." Various embodiments may use NLP to determine that Alex is assigned the task of doing the particular project by next month based on his assent and agreement that he will complete the task. In some embodiments the context data for completion, and the task itself as well, can also come from a transcribed conversation (e.g., a meeting).

The attachment name/type input 312 refers to an electronic file attachment name and/or electronic file attachment type. Such attachment name/type input 312 may be indicated in the candidate task itself, a candidate indication of completion of the task, and/or other contextual information. An attachment name can be the exact name that is used to save a file, and which can be indicated sent/received and opened by users. For example, a user can save a file as "sports_deparemnt_sales_figures_May_2021." Each of these natural language characters can be used to detect an indication that a task has been completed, as described in more detail below.

In another illustrative example of file attachment embodiments, a first user may say, "send me the sales numbers tomorrow." In some embodiments, one or more machine learning models are used to determine that past historical meetings discussed sales numbers around this same time last month, and that the file was for sales numbers for department Y. Additionally or alternatively, contextual data, such as phone calls or separate emails may more specifically describe that the sale numbers are for department Y for the month of May. Accordingly, particular embodiments can predict that the file name the speaker is referring to corresponds to a file name.

A file type is typically indicated at the end of a file name when saving and indicates the type of file. For example, using the illustration above, "sports_deparemnt_sales_figures_May_2021.PDF" can be detected to be a file type of Portable Document Format (PDF) based on the ending "PDF" words. Any suitable file type can be detected, such as WORD (via "Doc." indicia), Joint Photograph Expert Group (via "JPEG" indicia), Graphics Interchange Format (via "GIF" indicia), and the like. Each of these indicators can be used to detect an indication that a task has been completed, as described in more detail below.

The one or more candidate task completion model(s) 314 are generally responsible for using the inputs 304, 306, 306, 308, 310, and 312 in order to predict or output one or more indications of completion of tasks 316. Some embodiments use similar models as described above with respect to the candidate task detection model(s) 302, such as a HMM and/or a CNN. Alternatively or additionally, some embodiments user a modified BERT model. Specific model detail embodiments, including training, are described in more detail below.

In an illustration of using the various inputs to make the prediction at 316, the following example is given. The candidate task completion model(s) 314 can first determine and process that candidate task(s) 308. For example, the candidate task can be, "can you send it to me by Friday." However, this signal alone is likely not clear enough on its own, as it is unclear what "it" is referring to and other information, like a specific due date and who the candidate task is assigned to. Accordingly, the candidate task completion model(s) 314 may receive various contextual data 306, such as outside emails or other metadata, such as message that indicates that John is to send Jane sales numbers for the sports department. Accordingly, the candidate task completion model(s) 314 and/or the candidate task detection model(s) 302 can now determine previous unknown information concerning the candidate task—"[John]: can you send [sports department sales numbers] to [Jane] by Friday [May $22^{nd}$]." The words "John" and "Jane" can specifically be used as the "user metadata input 310." The candidate task completion model(s) 314 now have a good sense of what the candidate task is and what signals to listen to for task completion. Accordingly, candidates for indications of task completion can then be searched for based on some of the inputs. For example, John may simply attach a file (with no message) named "sports department sales figures May 2021.PDF" Accordingly, the candidate task completion model(s) 314 can then determine the file name ("sports department sales figures May 2021") and the file type ("PDF") (for example, the attachment name/type 312 input) and compare this information to what is already known. For example, the user metadata input 310 may be "John," as John is the one responsible for completing the task. Because the contextual data input 306 and the candidate task 308 indicate that John is to send sports department sales numbers to Jane by Friday [May $22^{nd}$, embodiments, such as NLP models (e.g., WORD2VEC) can responsively determine the semantic similarity of words in the file attachment (e.g., "sports department") to words in the candidate task detection models 302 (e.g., "sports department"), by for example, converting such words into feature vectors and then responsively determining a distance (e.g., a Euclidian or Cosine distance) between the words and/or aggregation of the words (e.g., via a dot product function). And based on the semantic similarity score exceeding or meeting a threshold, the file attachment can be marked as an indication that the candidate task has been completed.

Similar functionality can occur between any candidate natural language character sequence (not just a file name/type) that indicates that a candidate task has been completed and candidate tasks. For example, using the illustration above, John may alternatively or additionally send an email or a response thread chat message that says, "I just sent you the numbers." In some embodiments, the candidate task completion model(s) 314 also uses the contextual data 306 to assist with filling in or adding tags to additional details to further clarify the "I just sent you the numbers" candidate. For example, based on past emails or phone calls, the candidate can add further tags of "I [John] just sent you the [sports department sales numbers]." With this additional contextual information, the candidate task completion model(s) 314 can convert this message into a first feature vector and determine a distance to a second feature vector of "[John]: can you send [sports department sales numbers] to [Jane] by Friday [May 22$^{nd}$]," which is the candidate task. Based on the distance being within or meeting a distance threshold, the phrase "I just sent you the numbers" can be marked (e.g., highlighted) as an indication that the candidate task has been completed, which is the output 316.

Figure 4:
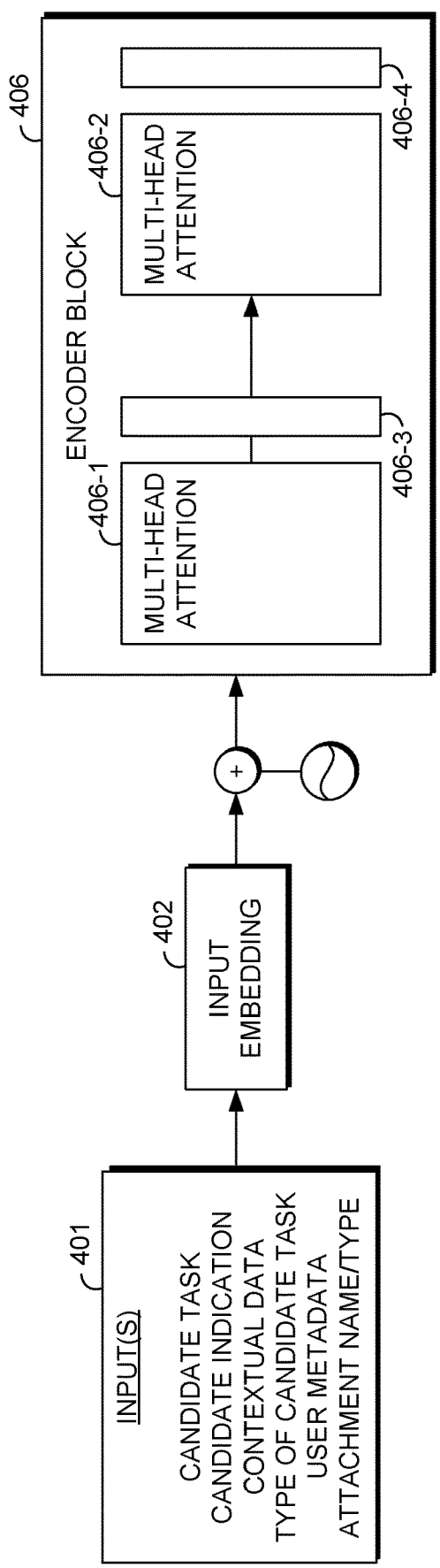
FIG. 4 is a block diagram of a modified BERT model or encoder that uses particular inputs to detect an indication for completion of a candidate task, according to some embodiments of this disclosure.

FIG. 4 is a block diagram of a modified BERT model or encoder that uses particular inputs to detect an indication for completion of a candidate task, according to some embodiments. In some embodiments, this model is used by the task-reply pre-training component 271, the task-reply fine-tuning component 274, and/or the task completion predictor 268. First, one or more of the inputs 401 are converted into feature vectors and embedded into input embedding 402 to derive meaning of an individual word. In some embodiments, the input(s) 402 represent the type of candidate task input 304, the contextual data input 306, the candidate task 308, the user metadata 310, and/or the attachment name/type input 312 of FIG. 3. In some embodiments, each word in the input(s) 401 is mapped into the input embedding 402 in parallel or at the same time, unlike existing LSTM models, for example.

The input embedding 402 maps a word to a feature vector representing the word. But the same word (e.g., "apple") in different sentences may have different meanings (e.g., phone v. fruit). This is why a positional encoder 404 can be implemented. A positional encoder is a vector that gives context to words (e.g., "apple") based on a position of a word in a sentence. For example, with respect to a message "I just sent the document," because "I" is at the beginning of a sentence, embodiments can indicate a position in an embedding closer to "just," as opposed to "document." Some embodiments use a sign/cosine function to generate the positional encoder vector as follows:

$$PE_{(pos,2i)} = \sin(pos/10000^{2i/d_{model}})$$

$$PE_{(pos,2i+1)} = \cos(pos/10000^{2i/d_{model}})$$

After passing the input(s) 401 through the input embedding 402 and applying the positional encoder 404, the output is a word embedding feature vector, which encodes positional information or context based on the positional encoder 404. These word embedding feature vectors are then passed to the encoder block 406, where it goes through a multi-head attention layer 406-1 and a feedforward layer 406-2. The multi-head attention layer 406-1 is generally responsible for focusing or processing certain parts of the feature vectors representing specific portions of the input(s) 401 by generating attention vectors. For example, in Question Answering systems, the multi-head attention layer 406-1 determines how relevant the ith word (or particular word in a block) is for answering the question or relevant to other words in the same or other blocks, the output of which is an attention vector. For every word, some embodiments generate an attention vector, which captures contextual relationships between other words in the same sentence, block, and or line. For a given word, some embodiments compute a weighted average or otherwise aggregate attention vectors of other words that contain the given word (e.g., other words in the same line or block) to compute a final attention vector.

In some embodiments, a single headed attention has abstract vectors Q, K, and V that extract different components of a particular word. These are used to compute the attention vectors for every word, using the following formula:

$$Z = softmax\left(\frac{Q \cdot K^T}{\sqrt{\text{Dimension of vector } Q, K \text{ or } V}}\right) \cdot V \quad (\#5)$$

For multi-headed attention, there a multiple weight matrices $W^q$, $W^k$ and $W^v$, so there are multiple attention vectors Z for every word. However, a neural network may only expect one attention vector per word. Accordingly, another weighted matrix, Wz, is used to make sure the output is still an attention vector per word. In some embodiments, after the layers 406-1 and 406-2, there is some form of normalization (e.g., batch normalization and/or layer normalization) performed to smoothen out the loss surface making it easier to optimize while using larger learning rates.

The layers 406-3 and 406-4 represent residual connection and/or normalization layers where normalization re-centers and re-scales or normalizes the data across the feature dimensions. The feed forward layer 406-2 is a feed forward neural network that is applied to every one of the attention vectors outputted by the multi-head attention layer 406-1. The feed forward layer 406-2 transforms the attention vectors into a form that can be processed by the next encoder block or making a prediction. As described in more detail herein, in some embodiments, the encoder block 406 is used to train a machine learning model and make inferences.

Figure 5:
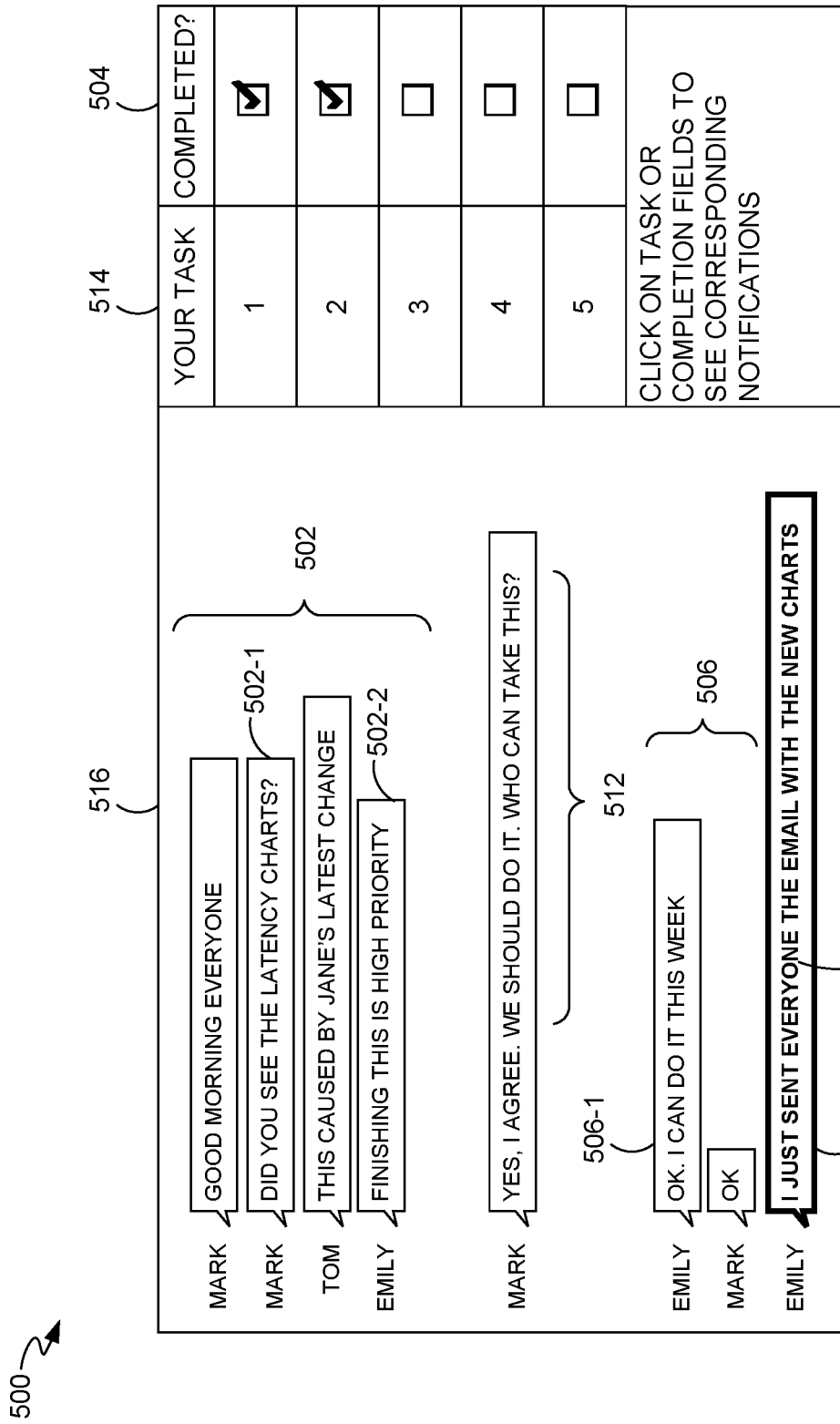
FIG. 5 is a screenshot of an example user interface that illustrates tasks and whether they were completed, according to some embodiments of this disclosure.

FIG. 5 is a screenshot 500 of an example user interface that illustrates tasks and whether they were completed, according to some embodiments. In some embodiments, the screenshot 500 is caused to be displayed by the presentation component 220 of FIG. 2. In some embodiments, the screenshot 500 represents a chatroom or other online event venue. The thread 516 includes the detected task candidate "we should do it" and/or "Who can take this?" 512 (e.g., as detected by the task extraction component 260). However, the candidate task 512 can appear very unclear, such as "who" is to do it, and what "it" is referring to. Various embodiments of the present disclosure can use other event context, such as the pre-event context 502 (e.g., the character sequences that were inputted before the candidate task 512 was inputted), and the post-event context 506 (e.g., the character sequence that were inputted after the candidate task 512 was inputted). Alternatively or additionally, various embodiments can use external contextual data, such as texts, emails, calendar data, and the like (e.g., as determined by the event monitor 250). For example, using the illustration of FIG. 5, embodiments can predict that "it" refers to finishing latency charts based on the statements 502-2 and 502-1 made by Mark and Emily, as well as outside emails that describe the latency charts being the topic of the meeting and that the task is to send different people an email with an attachment that describes the updated latency chart based on Jane's latest change. Additionally, embodiments can predict that the due date is "this week" based on the statement 506-1 made by Emily.

The thread 516 of the screenshot 500 additionally illustrates an indication 510 (for example, "I just sent everyone the email with the new charts") that the candidate task 512 has been completed (e.g., as detected by the task completion detector 270). In some embodiments, and as illustrated in the thread 516, such indication 510 can be marked with or otherwise associated with an indicator 508. The indicator 508 can be the bold font and bold messaging box around the indication 510 and can represent completion of the candidate task and/or where the indication 508 is located. Alternatively or additionally, the indicator 508 can be the indication 510 itself (for example, "I just sent everyone the email with the new charts"). Additionally or alternatively, the indicator 510 can be a highlighting or superimposition of color (e.g., red, green, blue) over the indication 510.

The screenshot 500 additionally illustrates a window pane with columns 514 and 504 illustrating candidate tasks assigned to a particular user and whether they have been completed respectively. In some embodiments, in response to receiving an indication that the user has selected an identifier of one of the tasks, such as the "1" indicia under the "your tasks" column, the thread 516 is caused to be displayed and the user can easily view, via candidate task 512, where the candidate task 512 is located among the thread 516. Alternatively or additionally, in response to receiving an indication that the user has selected an identifier of one of the tasks, the candidate task 512 (e.g., and only the candidate task 512) is displayed so that the user can view the candidate task 512. Alternatively or additionally, in some embodiments, additional information and tags that clarify the candidate task 512, as described above, can be displayed, such as what "it" is referring to, the due date "this week" and who the candidate task 512 is assigned to.

In like manner and in some embodiments, in response to receiving an indication that the user has selected a user interface element (e.g., the checked field) under the "completed?" column, the thread 516 is caused to be displayed and the user can easily view, via the indication 510, where the indication of task completion is located within the thread 516. Alternatively or additionally, in response to receiving an indication that the user has selected a user interface element, the indication 510 (e.g., and only the indication 510) is displayed so that the user can view the indication of completion of the candidate task 512. Alternatively or additionally, in some embodiments, additional information or tags that clarify the indication 510, can be displayed, such as who "everyone" is referring to, the fact that a file attachment was sent, the file name, the file type, and the like.

FIG. 6 is a screenshot 600 of an example user interface illustrating that the user can manually remove indications of task completions, according to some embodiments. FIG. 6 represents a virtual or online meeting or chat between meeting participants or attendees. The screenshot 600 may represent all of the event context of an event, such as everything that was uttered or stated within the event. This may include statements or threads, such as 602, which indicates that an action item has been completed.

In some embodiments, FIG. 6 illustrates functionality that can occur when the confidence for detecting a particular indication of completion of a corresponding task is lower than some threshold (e.g., 80%). For example, in response to the task completion detector 270 predicting or detecting, with a 75% confidence, that the statement "Okay I just sent you the document" is an indication for completion for a specific candidate task, particular embodiments cause display of the window 605, which gives the user the opportunity to remove the corresponding candidate task (e.g., via the button 606) or keep it (e.g., via the button 608) in case it is not an indication of completion of a particular candidate task. Some embodiments alternatively and automatically remove candidate tasks (or mark them as completed) when they are over the confidence threshold. For example, as illustrated in FIG. 5, in response to detecting that the indication 510 that the candidate task 512 has been completed, with a confidence of 90%, particular embodiments can cause presentation of the check mark inside the field next to task number 1.

FIG. 6 additionally illustrates other functionality, such as the buttons 602-1 and 602-3. In response to receiving an indication that the user has selected the button 602-1 particular embodiments cause presentation of additional context information (e.g., event context and/or external context), and/or other information that clarifies the indication 202 that a corresponding task, such as what the "document" is referring to and who "you" is referring to. In some embodiments, in response to receiving an indication that the user has selected the trash button 602-3, particular embodiments can remove the corresponding statement, thread, candidate task, and/or indication 602.

FIG. 6 additionally illustrates other functionality, such as the UI elements 610 and 612. These UI elements indicate how many candidate task are assigned to a respective user (and/or a particular group (e.g., a business unit)) and how man such candidate tasks have been completed respectively. In some embodiments, in response to receiving an indication that the user has selected the UI element 610, particular embodiments cause presentation of each candidate task (e.g., without the other event context or transcript thread) assigned to the user or group. In this way, the user can easily view each candidate task. Likewise, in some embodiments, in response to receiving an indication that the user has selected the UI element 612, particular embodiments cause presentation of each indication of completion for a given candidate task (e.g., without the other even context or transcript thread) assigned to the user or group. In this way, the user can easily view which candidate tasks have been completed.

Figure 7:
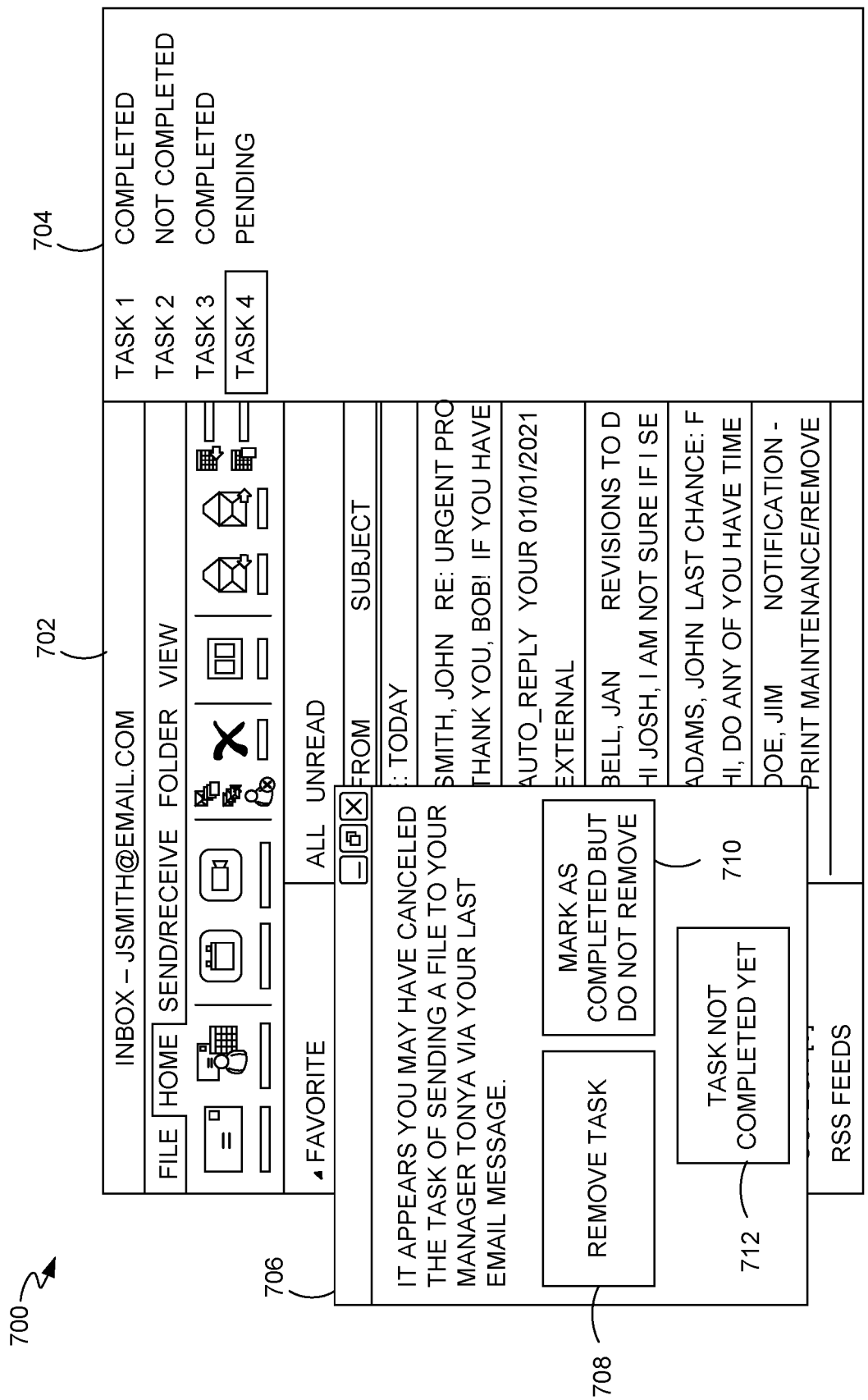
FIG. 7 is a screenshot of an example user interface illustrating different options users can take with respect to a given task completion indication, according to some embodiments of this disclosure.

FIG. 7 is a screenshot 700 of an example user interface illustrating different options users can take with respect to a given task completion indication, according to some embodiments. In some embodiments, the screenshot is caused to be presented by the presentation component 220. The screenshot 700 includes the email inbox thread 702, the window pane 704, and the pop-up window 706.

FIG. 7 at least partially illustrates that indications of task completion can be detected in platforms, such as email, other that in chat or messaging (e.g., as illustrated in FIGS. 5 and 6). For instance, the user may have sent an email, via a "send" button on the page 702, which reads, "Hi Tonya, I don't have access to the file, but John does." Accordingly, in response to the task completion detector 270 detecting this message and that it is an indication that a particular task (e.g., send file X to manager Tonya) has been completed (or cancelled), particular embodiments cause presentation of the window 706. Such task can correspond to the "task 4" indicated in the window pane 704, which is "pending" because the user has not made a selection at the window 706. In response to receiving an indication that the user has selected the "remove task" button 708, particular embodiments remove, from the task pane 704, the "task 4" and "pending" indicia. In response to receiving an indication that the user has selected the "mark as completed but not remove" button 710, particular embodiments change the "pending" indicia at the window pane 704 to "completed." In response to receiving an indication that the user has selected the "task not completed yet" button 712, particular embodiments change the "pending" indicia at the window pane 704 to "not completed."

In some embodiments, the window pane 704, the pop-up window 706, and/or corresponding functionality is configured to be part of a web browser that is displayed over any web application (e.g., corresponding to 702) and/or is configured to be displayed over any other app, plugin, or extension. For example, the window pane 704 and associated functionality can be generated over the chat application described with respect to FIG. 6 regardless of what application the user has opened. For instance, the user may close out the email inbox page 702 and open up the screenshot 600 with the same window pane 704 and its corresponding information (e.g., "task 1 completed") being displayed over both screenshots.

Figure 8:
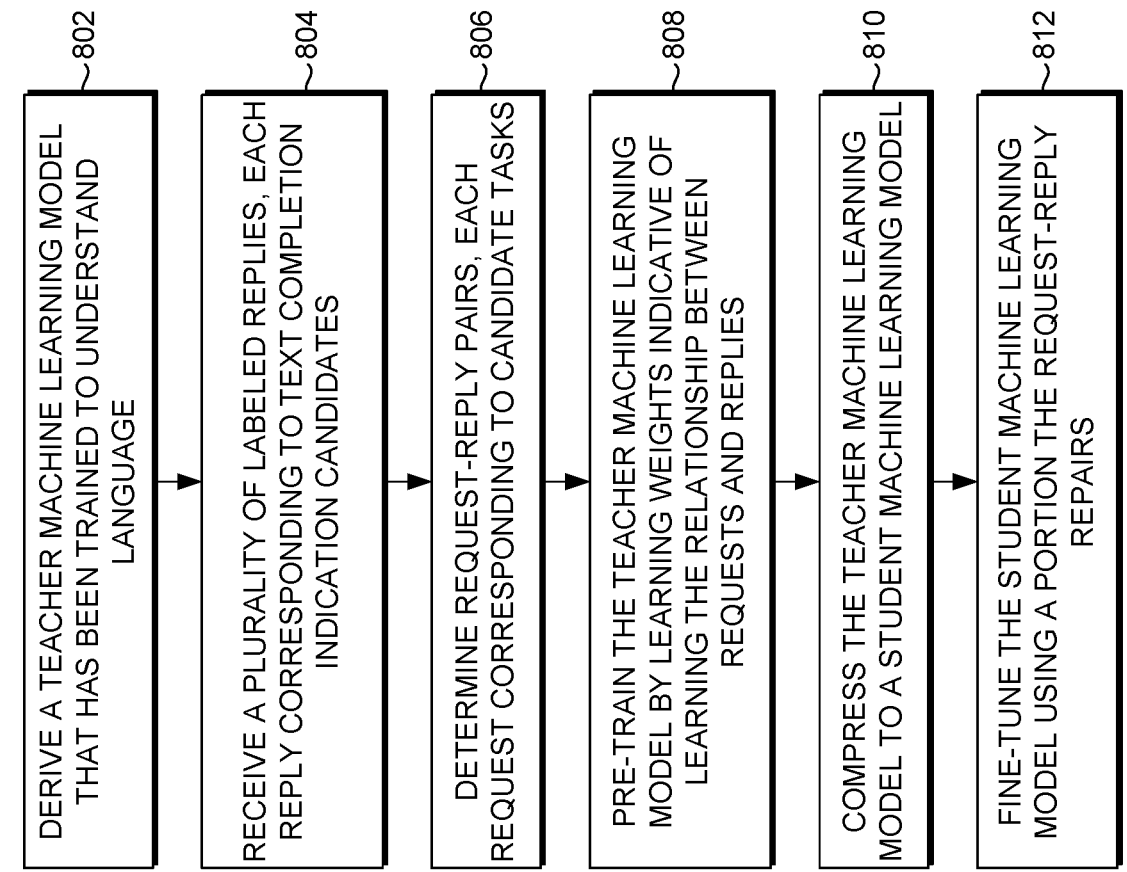
FIG. 8 is a flow diagram of an example process for pre-training, compressing, and fine-tuning a machine learning model, according to some embodiments of this disclosure.

Turning now to FIG. 8, which depicts a process 800 for pre-training, compressing, and fine-tuning a machine learning model, in accordance within embodiments of this disclosure. Process 800 (and/or any of the functionality described herein may be performed by processing logic that comprises hardware (e.g., circuitry, dedicated logic, programmable logic, microcode, etc.), software (e.g., instructions run on a processor to perform hardware simulation), firmware, or a combination thereof. Although particular blocks described in this disclosure are referenced in a particular order at a particular quantity, it is understood that any block may occur substantially parallel with or before or after any other block. Further, more (or fewer) blocks may exist than illustrated. Such added blocks may include blocks that embody any functionality described herein. The computer-implemented method, the system (that includes at least one computing device having at least one processor and at least one computer readable storage medium), and/or the computer storage media as described herein may perform or be caused to perform the processes 500 or any other functionality described herein.

Per block 802, particular embodiments derive a teacher machine learning model that has been trained to understand language. This is described, for example, with respect to the task-reply pre-training component 271 and the fine-tuning component 774, where a BERT model can perform MLM and NSP to understand language. In some embodiments, the teacher machine learning model can also undergo a first fine-tuning stage (different than the fine-tuning described at 812) in order for the teach model to generically learn the relationships between request and replies in several platforms (e.g., email, chat, etc.).

Per block 804, some embodiments receive a plurality of replies, where each reply is labeled as completed or not completed, and where each reply corresponds to a text completion indication candidate. For example, a reply can be the natural language sequence of "I sent the file yesterday," or an actual file name and/or type. In some embodiments, the replies that are labeled as "complete" (e.g., 0) are associated with different features or sub-labels. For example, a reply can be labelled or otherwise indicate a cancellation, such as "I can't sent you the document tomorrow," or "I won't be able to make it." This language indicates that the corresponding task candidates (e.g., can you send me the document) have been completed because they have been canceled or it is impossible to complete them. Cancelation of candidate tasks can occur from the owner sender of the candidate task and/or the receiver/owner of the completion for the candidate task. Likewise, there may be different features of candidate tasks that have not been completed. For example, after a candidate task has been detected, a user may issue a message that reads, "I will finish it by tomorrow," which is indicative of the candidate task not being complete. In another example, a user may issue a follow up question, such as "when is the document due by," which is indicative that the user has not completed the task since the user is asking questions about the due date.

Per block 806, some embodiments determine task-reply pairs, where each request corresponds to a task candidate. In some embodiments, task candidate are also labeled as task candidates or not task candidates. In some embodiments, task-reply pairs correspond to question-answer pairs used by Question Answering systems, as described herein. In some embodiments, each task-reply pair is also labeled, where a positive label (e.g., a 1) indicates that the particular reply belongs to or is the correct reply to a given request, and a negative label (e.g., 0) indicates that the particular reply does not belong to or is not the correct reply to the given request. In some embodiments, such task-reply pairs are generated randomly such that there are a combination of negative and positive labels.

Additionally, in some embodiments, correct task-reply pairs purposefully paired to learn corresponding features. In an illustrative example of these task-reply pairs, a negatively labeled request reply pair might be, "send me the file tomorrow" (the request) and the paired reply might be "I picked up the materials," clearly indicating that these do not belong to each other. In an illustrative example of a positively labeled request reply pair, "send me the file tomorrow" (the request) and the reply might be "I just sent you the file," which clearly indicates that these belong to each other.

Per block 808, using the task-reply pairs as input, some embodiments pre-train the teacher machine learning model by learnings weights indicative of learning the relationship between requests and replies. In some embodiments, there are additional inputs, such as the inputs 401 described with FIG. 4. Learning weights can be indicative of learning which features (e.g., cancellation language, non-completed language, and completed language) are associated with each of the labels over various epochs until a loss function is minimized. A "weight" in various instances represents the importance or significant of a feature or feature value for classification or prediction. For example, each feature may be associated with an integer or other real number where the higher the real number, the more significant the feature is for prediction or classification. In some embodiments, a weight in a neural network or other machine learning application can represent the strength of a connection between nodes or neurons from one layer (an input) to the next layer (an output). A weight of 0 may mean that the input will not change the output, whereas a weight higher than 0 changes the output. The higher the value of the input or the closer the value is to 1, the more the output will change or increase. Likewise, there can be negative weights. Negative weights proportionately reduce the value of the output. For instance, the more the value of the input increases, the more the value of the output decreases. Negative weights may contribute to negative scores.

In some embodiments, the training includes learning an embedding of feature vectors representing task-reply pairs in feature space. Learning an embedding may include learning the distance between request and replies based on feature similarity of values between the vectors and adjusting weights of the deep learning model. For example, the more that language (and/or contextual information) between a request and reply are matching or are within a threshold feature vector value, the closer the two are to each other in feature space, whereas when features do not match or are not within a feature vector value threshold, the further away the two are from each other in feature space. Accordingly, in response to various training stages, the strength of connection between nodes or neurons of different layers can be weighted higher or strengthened based on the corresponding learned feature values that are most prominent or important for a set of requests and replies. In this way, for example, an entire feature space may include an embedding of vectors or other indications that are all learned or embedded in feature spaced based on learning weights corresponding to different features.

In learning these weights, some embodiments, some embodiments can determine a distance between a ground truth position (for example, the "completed" replies or correct (positive label) task-reply pairs) and the "not completed" replies ad the incorrect (negative label) task-reply pairs. Based on the loss (e.g., the difference in distance between the ground truth and negative labels) determined by a loss function (e.g., Mean Squared Error Loss (MSEL), cross-entropy loss), the loss function learns to reduce the error in prediction over multiple epochs or training sessions so that the model learns which features and weights are indicative of completed replies and the specific replies that belong to them. In this way, for example, when an incoming candidate for task completion is analyzed after model deployment, the model can extract the features and embed in feature space in order to classify as an indication for a particular completion or not.

Per block 810, some embodiments compress the teacher machine learning model to a student machine learning model. Examples of such compression is described with respect to the knowledge distillation component 272 of FIG. 2. Per block 812, responsive to the compression at block 810, particular embodiments fine-tune the student machine learning model using a portion of the task-reply pairs. Examples of this are described with respect to the task-reply fine-tuning component 274 and/or the knowledge distillation component 272 of FIG. 2. In some embodiments, fine-tuning can include identical functionality as described with respect to 808, except that the loss minimization is different given the smaller model. For example, as described with respect to the knowledge distillation component 272, particular embodiments can minimize the cross-entropy between the model's predicted distribution and the one-hot empirical distribution of training labels, where for training loss, the student is trained with a distillation loss over the soft target probabilities of the teacher:

$$L_{ce} = \Sigma_i t_i * \log(s_i).$$

In this way, the student model can be trained to minimize a loss identical to the final loss of the teacher model.

Figure 9:
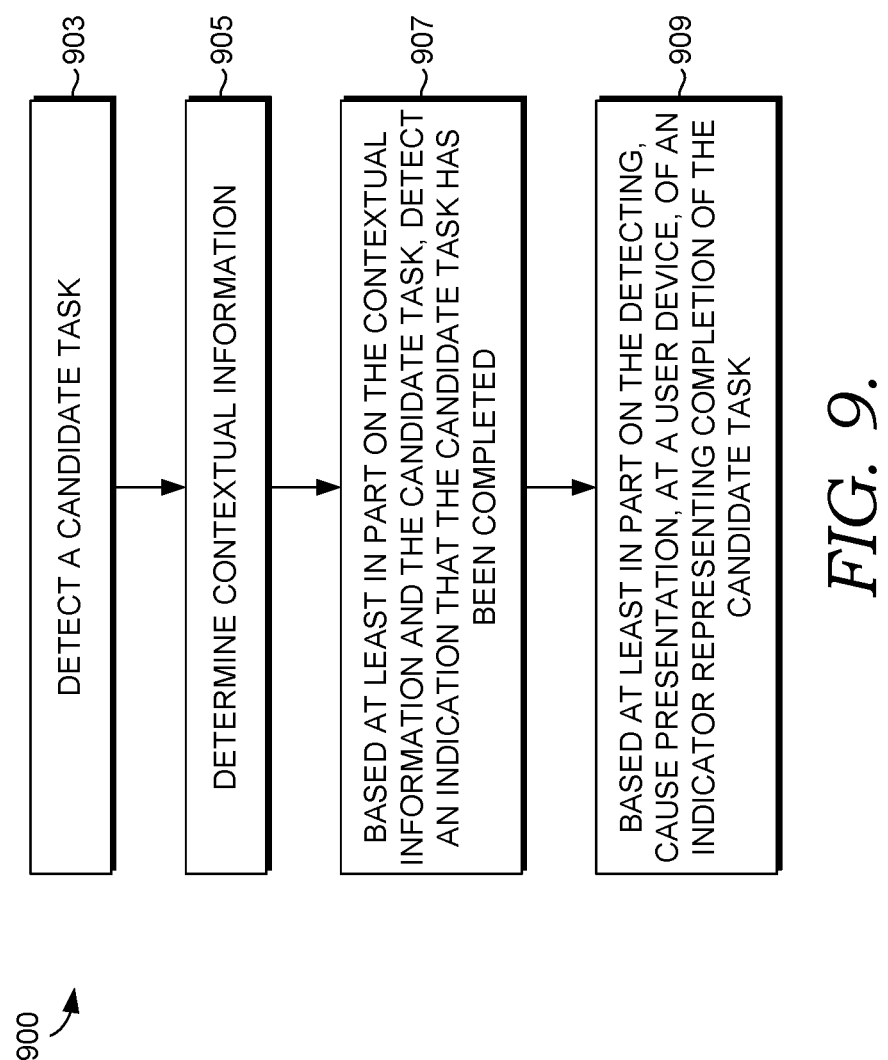
FIG. 9 is a flow diagram of an example process for detecting an indication that a candidate task has been completed, according to some embodiments of this disclosure.

FIG. 9 is a flow diagram of an example process 900 for detecting an indication that a candidate task has been completed, according to some embodiments. Per block 903, particular embodiments detect a candidate task, where the candidate task indicates an action that needs to be accomplished by one or more users. Examples of block 903 are described with respect to the task extraction component 260 of FIG. 2. For example, a candidate task action can be to send a file, send a message, pick up a package, or the like. In some embodiments, task candidates can be categorized as user activity (e.g., send a message, attach a file, etc.) or real world activity, which is not user activity (e.g., pick up someone from practice, lock the door, etc.). In some embodiments, the candidate task is indicative of a question asked by a user (e.g., "can you send me the file?") and an indication of completion is indicative of an answer to the question (e.g., "I just sent the file"), as described, for example with respect to the QA functionality of the task completion detector 270. In some embodiments, the candidate task and/or the indication of completion is detected in natural language content (e.g., a chat page). In some embodiments, such natural language content is written natural language content (e.g., a chat thread, an email page, a web page, an app activity, etc.). Alternatively or additionally, such naturally language content is auditory, such as spoken words at a virtual assistant (e.g., a smart speaker) or meeting application (e.g., MICROSOFT TEAMS).

Per block 905, some embodiments determine contextual information. In some embodiments, such contextual information can include or represent the information determined by the contextual information determiner 254 or user profile 240 of FIG. 2 and/or the contextual data 306 of FIG. 3. In some embodiments the contextual information is associated with the candidate task, which means that it can be contained in the same event context as a candidate task and/or indication of completion and/or external context. In some embodiments, such contextual information includes an indication of a file attachment name or type associated with the candidate task. For example, a candidate indication for task completion may just be a file with the name "sales figures May 2021") where the contextual information is the name of the file. In some embodiments, the contextual information determined at block 905 is one or more of the inputs described in FIG. 3-304, 306, 308, 310, and/or 312.

Per block 907, some embodiments detect an indication that the candidate task has been completed based at least in part on the contextual information and the candidate task. Examples of this are described with respect to the task completion predictor 268 of FIG. 2, and the indication(s) of completion of task(s) 316 of FIG. 3. In an illustrative example, based at least in part on the file attachment name or type associated with the candidate task, some embodiments detect, from second natural language content, an indication that the task has been completed. For example, a candidate task may say, "send me the department Y sales" and the indication may just be a file, with a file name as "department Y sales." Accordingly, using natural language processing and/or other machine learning functionality, some embodiments can determine that the feature vectors representing these are close in distance and should be paired, and more specifically that the indication has been detected.

In some embodiments, such detection includes making a prediction that a natural language sequence (e.g., a candidate indication) indicates a completion of a particular predicted candidate task (e.g., that the particular natural language sequence belongs to or is a response to the candidate task) based on matching hashes or feature vectors representing the candidate task and the corresponding contextual information with hashes or feature vectors and other contextual information representing indications of completion.

In some embodiments, the detection of the indication of completion of the candidate task is based on training a machine learning model that learns a relationship between candidate tasks and a first set of replies that belong to the candidate tasks and a second set of replies that do not belong to the candidate tasks. This is described with respect to FIG. 8, where the machine learning model can learn weights of features of differently paired requests and responses (for example, positively and negatively labeled pairs). In this way, when an unseen candidate indication for task completion is received, the model can then compute a distance between the unseen candidate indication and other trained indications (labeled as completed or not completed) in order to determine whether the candidate indication is an indication of completion, since the model has learned weights or features of candidate indications and non-candidate indications. For example, if the training data always predicts sentences that start with the phrase, "I just sent the file . . . " or similar language is indicative of an indication of completion, then the unseen candidate will be embedded closely in feature space and be likewise predicted to be an indication of completion.

Additionally or alternatively, some embodiments compute a distance between the unseen candidate indication and a set of task candidates to see which task candidate that unseen candidate indication belongs to or should be paired with. The closer in distance, the more likely a given task candidate task is the correct pairing for the indication of completion. For example, a first task candidate may have features of, "please send me file X," and the unseen candidate indication may be, "I just sent you file X." Because the words "file X" and or other contextual information match between the two feature vectors, they will be very close in distance and likely will reflect that they should be paired together.

Figure 10:
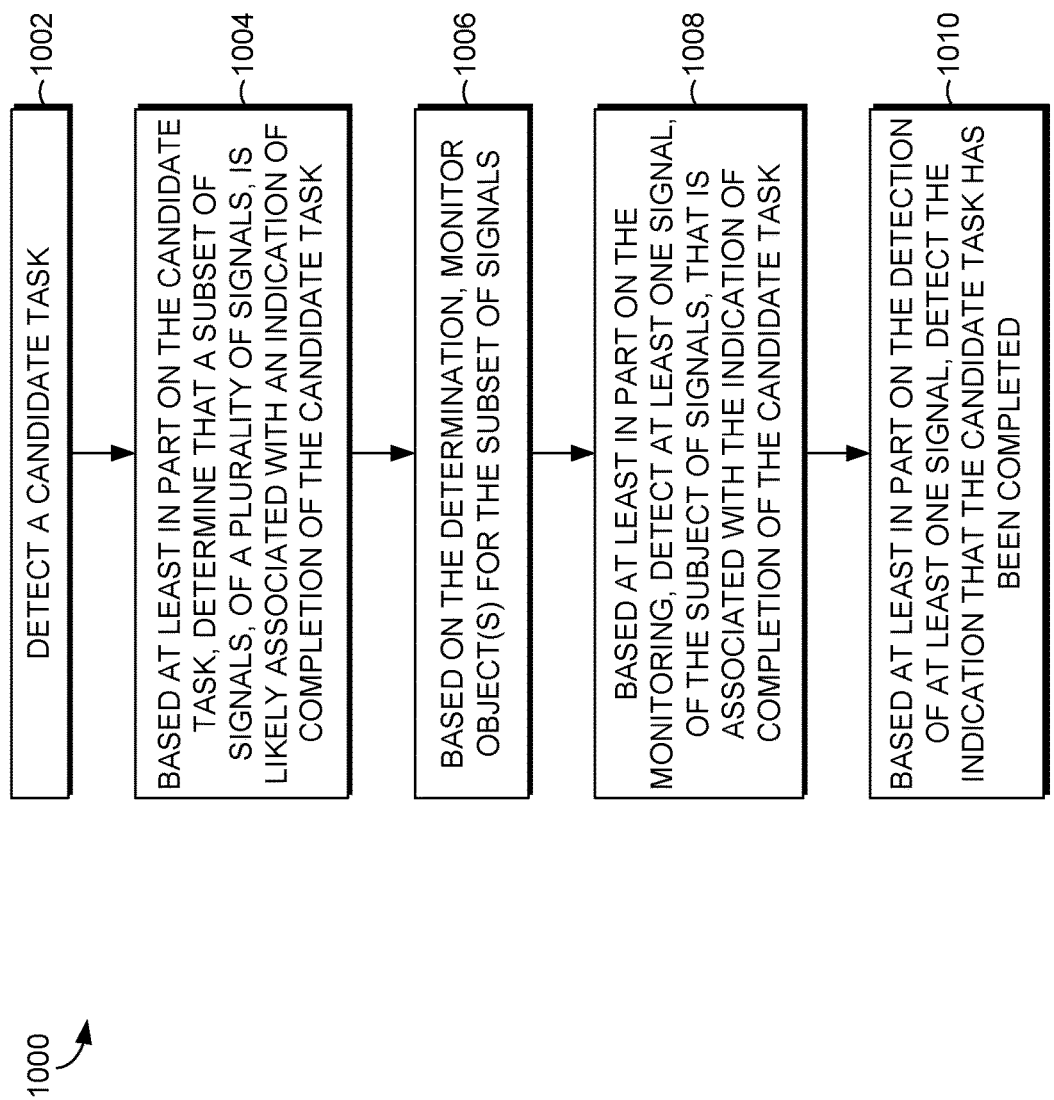
FIG. 10 is a flow diagram of an example process for detecting an indication of completion of a candidate task, according to some embodiments of this disclosure.

In some embodiments, the detection of the indication that the candidate task has been completed at block 907 is further based on detecting at least one signal of the subset of signals.(e.g., as described with respect to block 1008 of FIG. 10), where one or more objects have been monitored for the subset of signals after a determination that the subset of signals, of a plurality of signals, are likely to be associated with the indication of completion (as described with respect to blocks 1004 and 1006 of FIG. 10).

Per block 909, some embodiments cause presentation, at a user device, of an indicator representing completion of the candidate task. An example of an "indicator" is described with respect to the indicator 508 of FIG. 5. In some embodiments, such indicator can alternatively or additionally be natural language words, such as the indication of completion itself, a message, a pop-up window (e.g., 604 of FIG. 6), removal of the indication, the corresponding candidate task being marked for completion (e.g., the check box indicated under the "complete?" column 504 of FIG. 4). In some embodiments, the indicator includes highlight indicia superimposed over words of natural language content that indicate completion of the candidate task.

In some embodiments, the user interface described at block 909 can include additional or alternative information. For example, some embodiments cause presentation (or generate), at the user device, of a user interface element indicative of removal of the candidate task upon user-selection of the user interface element. Examples of this are described with respect to the "remove task" button 708, which can be such user interface element. Other examples of this is the "Yes" button 606 or trash button 602-3 of FIG. 6.

Some embodiments additionally or alternatively cause presentation (or generate), at a user device, of a set of user interface elements that indicate a list of candidate task and an indication of whether each candidate task of the list has been completed. Examples of this are described with respect to the "your task" column 514 and "completed?" column 504 of FIG. 5, and the task pane 704 of FIG. 4. Some embodiments additionally or alternatively automatically remove (or mark) the candidate task for completion by a user based on a confidence level associated with the detection of the indication of completion. Examples of this are described with respect to FIG. 7 and FIG. 5, where, for example, the "1" and corresponding record values (or candidate task 512) can be removed from the columns 514 and/or 504 (and/or the thread 516), if the confidence level is above a threshold (e.g., 80%).

FIG. 10 is a flow diagram of an example process 1000 for detecting an indication of completion of a candidate task, according to some embodiments. Per block 1002, particular embodiments detect a candidate task where, for example, the candidate task indicates an action (e.g., user activity or real world actions) that is a candidate (in the running) for accomplishing by one or more users. In some embodiments, block 1002 includes identical functionality described with respect to 903 of FIG. 9.

Per block 1004, some embodiments determine that a subset of signals, of a plurality of signals, are likely to be associated with (e.g., include) an indication of completion of the candidate task based at least in part on the candidate task. Examples of block 1004 are described with respect to the pruning component 276 of FIG. 2. In an illustrative example, the pruning component 276 can determine that a user's email application or particular send message (a signal) is likely to contain the indication of completion based on the candidate task being "send me an email tomorrow." Some embodiments can, for example, perform NLP to match "email" with an "email" signal as located in a graph structure.

In some embodiments, the plurality of signals include at least one signal of a group of signals, such as a particular file attachment name or type, a set of words (e.g., in a message thread or chat), an indication that a meeting application is being used, an indication that an email application is being used, an indication that a telecommunications channel is opened, or any indication that any suitable application or communication channel (e.g., SMS, telecommunications) is being used. In some embodiments, "being used" corresponds to detecting user login or other user activity, such as communication session establishment with a particular user device (e.g., via SYN, ACK, SYN-ACK). Such "indications" that a particular application is being used can be receipt, over a network, of a flag (e.g., TRUE) or value that indicates a user is using a particular platform. For example, in response to establishing a communication session between a user device and a server, the server (or user device) may include API functionality to automatically contact, over a network, with the machine hosting the pruning component 276 in order to notify or infer that a particular user is using an application. Such notification can pass an identifier identifying a user or user device to identify the user.

In response to the determining at block 1004, some embodiments prune a data structure for the monitoring. Specifically, for example, a data structure can indicate the plurality of signals and the pruning can include removing a portion of the data structure that does not represent the subset of signals. Examples of this are described with respect to the pruning component 276 of FIG. 2. For example, each node in a graph may represent a signal or object associated with the signal, such as a set of words, application, or communications channel. If the candidate task is "I'll call you tomorrow," the signal that is most likely to be associated with an indication of completion is a telecommunications channel. Accordingly, particular embodiments prune the nodes of the graph representing another communications channel (e.g., SMS) and other particular applications (e.g., email, chat, etc.) such that only the node representing the telecommunications channel is walked, which is indicative of only the telecommunications channel being monitored (and none of the other sources).

Per block 1006, based at least in part on the determination at block 1004 (and/or the pruning), some embodiments monitor one or more objects for the subset of signals. Examples of this are described with respect to the pruning component 276 of FIG. 2. For example, based on pruning the graph structure described above, embodiments may solely listen to or monitor a telecommunications channel (the object) for an indication (the signal) that the user has engaged in a telecommunications channel session. In another example, based on determining that a user's email application is likely to include the indication of task completion, particular embodiments monitor the email application at the user device (one or both can be the object) for a signal that a user is currently using (e.g., has logged into) the email application.

Per block 1008, particular embodiments detect at least one signal, of the subset of signals that is associated with the indication of completion of the candidate task based at least in part on the monitoring. For example, using the illustrations above, some embodiments detect the indication that the user has engage in a telecommunications session. Likewise, some embodiments can detect an indication that the user is currently using an email application. In another example, some embodiments can detect specific words being used at a chat room or detect that a user has sent a specific attachment.

Per block 1010, some embodiments detect (e.g., from second natural language content) the indication that the candidate task has been completed based at least in part on the detection of at least one signal. For example, using the illustrations above, after detecting that the user is engaged in a telecommunications session, embodiments can detect the words "I sent the file," on the telecommunications channel, which is an indication that the candidate task of sending the file has been completed. In another example, in response to detecting an indication that the user is currently using an email application, some embodiments can detect a particular file name or words used when sending an email using the email application, which is the indication of completion. In another example, based on the detection of specific words (the signals) being used at a chat room, particular embodiments can then detect that those specific words (or a specific word within the set of specific words) are indications that the candidate task has been completed.

In response to the detection at block 1010, some embodiments cause presentation (or generate), at a user device, of an indicator representing completion of the candidate task. Such functionality can be or include the functionality described with respect to block 909 of FIG. 9.

Other Embodiments

In some embodiments, a computerized system, such as the computerized system described in any of the embodiments above, comprises one or more processors, computer storage memory having computer-executable instructions stored thereon which, when executed by the one or more processors, implement a method. The method comprises from a plurality of signals associated with a task indicating an action to be accomplished by at least one person, determining a subset of signals such that each signal in the subset is associated with an indication of completion of the task. The method further includes, based at least in part on the determination, monitoring a user device for the subset of signals. The method further includes, based at least in part on the monitoring and the task, detecting at least one signal, of the subset of signals. The method further includes, based at least in part on the detecting the at least one signal, detecting, from natural language content, the indication of completion of the task. The method further includes, based at least in part on the detecting of the indication of completion of the task, causing presentation, at the user device, of an indicator representing the completion of the task. Advantageously, these and other embodiments, as described herein, improve the way computers operate in terms of computer resource consumption (e.g., CPU, memory, I/O, network latency). Instead of walking entire decision trees or other data structures when engaging in task completion detection, particular embodiments can determine that a subset of signals are likely to include an indication of completion of the candidate task. And based on the determination, monitor an object for only the subset. For instance, if each node represents a signal or data source to poll or monitor for completion, embodiments can "prune" or remove particular nodes of a graph that does not represent the subset of signals. In this way, the entire graph does not have to be walked, and more specifically, each signal does not have to be listened to or monitored. Accordingly, there is a decrease in storage device I/O (e.g., excess physical read/write head movements on non-volatile disk), a decrease in CPU utilization, and/or network latency because fewer nodes are walked or fewer signals are monitored. Accordingly, components do not have to repetitively reach out to the storage device to perform read/write operations. Likewise, there are not as many packet generation and other network costs because there are fewer signals to monitor and thus fewer network protocol sessions to establish. Additionally, some embodiments do not have to store or transmit entire decision trees or other data structures representing these signals, so there is no unnecessary consumption of memory.

In any combination of the above embodiments of the computerized system, the subset of signals comprises a particular set of words based on a semantic meaning of the task, and wherein the detecting includes detecting the particular set of words from the natural language content.

In any combination of the above embodiments of the computerized system, the subset of signals comprises an indication that a particular application is being used, and wherein the detecting includes detecting the indication that the particular application is being used.

In any combination of the above embodiments of the computerized system, the plurality of signals includes at least one signal of a group of signals consisting of: a particular attachment file name, a particular attachment file type, a set of words, an indication that a meeting application is being used, an indication that an email application is being used, and an indication that a telecommunications channel is opened.

In any combination of the above embodiments of the computerized system, the method can further comprise pruning a data structure for the monitoring, in response to the determining that the subset of signals is likely to be associated with the indication of completion of the task.

In any combination of the above embodiments of the computerized system, the task is indicative of a question asked by a user, and wherein the indication of completion is indicative of an answer to the question.

In any combination of the above embodiments of the computerized system, the natural language content includes at least one of: audio natural language content and written natural language content.

In any combination of the above embodiments of the computerized system, the indicator representing the completion of the task includes highlight indicia superimposed over words of at least a portion of the natural language content, the highlight indicia indicating the completion of the task.

In any combination of the above embodiments of the computerized system, the method can further comprise causing presentation, at the user device, of a user interface element indicative of removal of the task upon user-selection of the user interface element.

In any combination of the above embodiments of the computerized system, the method can further comprise causing presentation, at the user device, of a set of user interface elements that indicate a list of tasks and an indication of whether each task of the list has been completed.

In any combination of the above embodiments of the computerized system, the method can further comprise automatically removing the task for completion by a user based on a confidence level associated with the detecting of the indication of completion.

In any combination of the above embodiments of the computerized system, the detecting of the indication of the completion of the task is based on a machine learning model trained to learn a relationship between tasks and a first set of replies that belong to the tasks and a second set of replies that do not belong to the tasks.

In some embodiments, a computer-implemented method is provided. The method may include receiving first natural language content, and/or detecting, from the first natural language content, a task, the task indicates an action to be accomplished by one or more users. The method further includes determining contextual information associated with the task, wherein the contextual information includes an indication of an attachment file name or attachment file type associated with the task. The method further includes, based at least in part on the attachment file name or the attachment file type, detecting, from a second natural language content, an indication that the task has been completed. The method further includes, based at least in part on the detecting of the indication that the task has been completed, causing presentation, at a user device, of an indicator representing completion of the task. Advantageously, these and other embodiments, as described herein, improve existing word processing applications, meeting applications, and virtual assistants, among others, by providing functionality that automatically detects indications that tasks have been completed via new logic or rules (e.g., a file name or file type specified in the indication). As described above, tasks must be manually performed or marked as completed in various existing technologies, and have only been historically performed by humans or manual input of users. In particular embodiments, incorporating these particular rules improves existing technological processes by providing new functionality that effectively performs these tasks automatically and more accurately. Particular embodiments notify users when such tasks have been completed or are no longer relevant or delete such tasks so that users will not see them as tasks. Accordingly, users are not unnecessarily reminded of tasks. This not only improves the user experience relative to existing technologies, but improves the accuracy relative to existing technologies because such tasks are deleted or at least marked as completed.

In any combination of the above embodiments the detecting of the indication that the task has been completed includes determining that the second natural language content includes at least one word that match the attachment file name, and determining that the at least one word is indicative of a response to the task.

In any combination of the above embodiments, the method may further comprise, based at least in part on a meaning of the task, determining that a subset of signals, of a plurality of signals, is associated with the indication that the task has been completed, the plurality of signals including a plurality of applications, the subset of signals including a first application.

In any combination of the above embodiments, the method may further comprise, based at least in part on the determination that the subset of signals is associated, monitoring the user device for an indication that the first application is being used.

In any combination of the above embodiments, the method may further comprise, based at least in part on the monitoring, detecting that the first application is being used, wherein the detecting of the indication that the task has been completed is further based at least in part on detecting that the first application is being used.

In any combination of the above embodiments the first natural language content and the second natural language content include at least one of: audio natural language content and written natural language content.

In any combination of the above embodiments the determining contextual information includes identifying a natural language phrase corresponding to request for a particular file, and wherein the detecting of the indication that the task has been completed includes determining that a user has sent the particular file based on the file attachment name indicating the particular file.

In some embodiments, one or more computer storage media having computer-executable instructions embodied thereon that when executed by one or more processors, cause the one or more processors to perform a method. The method may include detecting, from first natural language content, a task, the task indicates an action to be accomplished by one or more users. The method further includes, based at least in part on the task, determining that a subset of signals, of a plurality of signals, is associated with an indication of completion of the task. The method further includes, based on the determining, pruning a data structure that indicates the plurality of signals, the pruning includes removing a portion of the data structure that does not represent the subset of signals. The method further includes, based at least in part on the pruning, monitoring a user device for the subset of signals. The method further includes, based at least in part on the monitoring, detecting at least one signal, of the subset of signals. The method further includes, based at least in part on the detecting of at least one signal, detecting, from second natural language content, the indication of completion of the task. Advantageously, these and other embodiments, as described herein, improve the functionality relative to existing machine learning models. Particular embodiments use models that are more accurate because they use certain inputs and are optimized to specifically train by learning the relationships between tasks and responses that indicate completion of those tasks (e.g., via a modified pre-training and fine-tuning phase). For example, some embodiments use models that take, as input, an attachment name or type mentioned or otherwise associated with a task to better detect the indication of completion (e.g., an upload of the particular file).

In any combination of the above embodiments the determining that a subset of signals, of a plurality of signals, is associated with an indication of completion of the task includes determining that a set of words that are a part of the task will also be indicated in a reply to the task.

In any combination of the above embodiments the detecting, from second natural language content, the indication of completion of the task includes detecting, from the second natural language content, the set of words.

In any combination of the above embodiments the method may further include causing presentation, at the user device, of a user interface element indicative of removal of the task upon user-selection of the user interface element.

Overview of Exemplary Operating Environment

Figure 11:
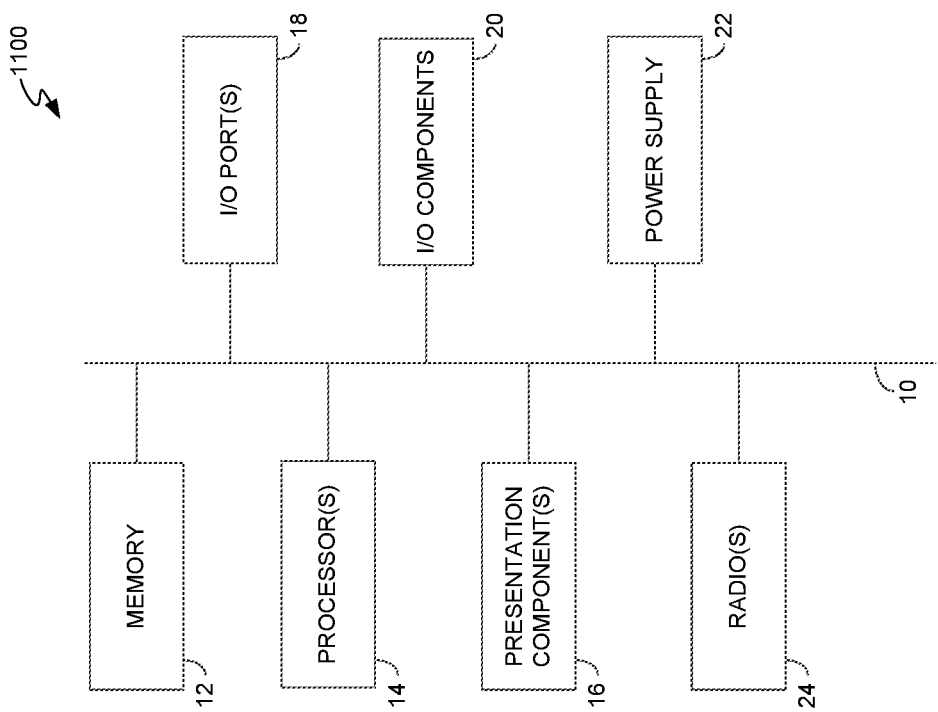
FIG. 11 is a block diagram of a computing device for which embodiments of this disclosure are employed.

Having described various implementations, an exemplary computing environment suitable for implementing embodiments of the disclosure is now described. With reference to FIG. 11, an exemplary computing device is provided and referred to generally as computing device 1100. The computing device 1100 is but one example of a suitable computing environment and is not intended to suggest any limitation as to the scope of use or functionality of embodiments of the disclosure. Neither should the computing device 1100 be interpreted as having any dependency or requirement relating to any one or combination of components illustrated.

Embodiments of the disclosure may be described in the general context of computer code or machine-useable instructions, including computer-useable or computer-executable instructions, such as program modules, being executed by a computer or other machine, such as a personal data assistant, a smartphone, a tablet PC, or other handheld device. Generally, program modules, including routines, programs, objects, components, data structures, and the like, refer to code that performs particular tasks or implements particular abstract data types. Embodiments of the disclosure may be practiced in a variety of system configurations, including handheld devices, consumer electronics, general-purpose computers, more specialty computing devices, etc. Embodiments of the disclosure may also be practiced in distributed computing environments where tasks are performed by remote-processing devices that are linked through a communications network. In a distributed computing environment, program modules may be located in both local and remote computer storage media including memory storage devices.

With reference to FIG. 11, computing device 1100 includes a bus 10 that directly or indirectly couples the following devices: memory 12, one or more processors 14, one or more presentation components 16, one or more input/output (I/O) ports 18, one or more I/O components 20, and an illustrative power supply 22. Bus 10 represents what may be one or more busses (such as an address bus, data bus, or combination thereof). Although the various blocks of FIG. 11 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 11 is merely illustrative of an exemplary computing device that can be used in connection with one or more embodiments of the present disclosure. Distinction is not made between such categories as "workstation," "server," "laptop," "handheld device," etc., as all are contemplated within the scope of FIG. 11 and with reference to "computing device."

Computing device 1100 typically includes a variety of computer-readable media. Computer-readable media can be any available media that can be accessed by computing device 1100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 1100. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 12 includes computer storage media in the form of volatile and/or nonvolatile memory. The memory may be removable, non-removable, or a combination thereof. Exemplary hardware devices include solid-state memory, hard drives, optical-disc drives, etc. Computing device 1100 includes one or more processors 14 that read data from various entities such as memory 12 or I/O components 20. Presentation component(s) 16 presents data indications to a user or other device. In some implementations, presentation component 220 of system 200 may be embodied as a presentation component 16. Other examples of presentation components may include a display device, speaker, printing component, vibrating component, and the like.

The I/O ports 18 allow computing device 1100 to be logically coupled to other devices, including I/O components 20, some of which may be built in. Illustrative components include a microphone, joystick, game pad, satellite dish, scanner, printer, wireless device, etc. The I/O components 20 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 1100. The computing device 1100 may be equipped with depth cameras, such as stereoscopic camera systems, infrared camera systems, RGB camera systems, and combinations of these, for gesture detection and recognition. Additionally, the computing device 1100 may be equipped with accelerometers or gyroscopes that enable detection of motion. The output of the accelerometers or gyroscopes may be provided to the display of the computing device 1100 to render immersive augmented reality or virtual reality.

Some embodiments of computing device 1100 may include one or more radio(s) 24 (or similar wireless communication components). The radio 24 transmits and receives radio or wireless communications. The computing device 1100 may be a wireless terminal adapted to receive communications and media over various wireless networks. Computing device 1100 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (for example, a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Many different arrangements of the various components depicted, as well as components not shown, are possible without departing from the scope of the claims below. Embodiments of the disclosure have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

What is claimed is:

1. A computerized system comprising:
one or more processors; and
computer storage memory having computer-executable instructions stored thereon which, when executed by the one or more processors, implement a method comprising:
detecting, from natural language content, a task that indicates an action to be accomplished by one or more users;
based on the detecting, determining, from a plurality of attachment file names or types which are not directly part of the natural language content, a subset of attachment file names or types that indicate completion of the task;
based at least in part on the determination, monitoring a user device for user input indicating the subset of attachment file names or types;
based at least in part on the monitoring and the task, detecting the user input indicating the subset of attachment file names or types;
based at least in part on the detecting of the user input the completion of the task; and
based at least in part on the detecting of the completion of the task, causing presentation, at the user device, of an indicator representing the completion of the task.

2. The system of claim 1, wherein the detecting of the completion is further based on detecting a particular set of words from the subset of attachment file names.

3. The system of claim 1, wherein the detecting of the completion is further based on detecting indication that a particular application is being used.

4. The system of claim 1, wherein the detecting of the completion of the task is further based on at least two of: a set of words, an indication that a meeting application is being used, an indication that an email application is being used, and an indication that a telecommunications channel is opened.

5. The system of claim 1, further comprising: pruning a data structure for the monitoring, in response to the determining that the subset of attachment file names or types is likely to be associated with the completion of the task.

6. The system of claim 1, wherein the task is indicative of a question asked by a user, and wherein the completion is indicative of an answer to the question.

7. The system of claim 1, wherein the detection of of completion is further based on detecting, from natural language content, at least one of:
audio natural language content and written natural language content.

8. The system of claim 1, wherein the indicator representing the completion of the task includes highlight indicia superimposed over words of at least a portion of natural language content, the highlight indicia indicating the completion of the task.

9. The system of claim 1, further comprising, causing presentation, at the user device, of a user interface element indicative of removal of the task upon user-selection of the user interface element.

10. The system of claim 1, further comprising, causing presentation, at the user device, of a set of user interface elements that indicate a list of tasks and an indication of whether each task of the list has been completed.

11. The system of claim 1, further comprising, automatically removing the task for completion by a user based on a confidence level associated with the detecting of the completion.

12. A computer-implemented method comprising:
detecting, from a first natural language content, a task, the task indicates an action to be accomplished by one or more users;
in response to the detecting of the task, determining that an attachment file name or attachment file type indicates completion of the task;
wherein the attachment file name and attachment file type are not directly part of the first natural language content;
based at least in part on the attachment file name or the attachment file type, detecting, from a second natural language content, an indication that the task has been completed; and
based at least in part on the detecting of the indication that the task has been completed, causing presentation, at a user device, of an indicator representing completion of the task.

13. The method of claim 12, wherein the detecting of the indication that the task has been completed includes determining that the second natural language content includes at least one word that match the attachment file name, and determining that the at least one word is indicative of a response to the task.

14. The method of claim 12, further comprising:
based at least in part on a meaning of the task, determining that a subset of signals, of a plurality of signals, is associated with the indication that the task has been completed, the plurality of signals including a plurality of applications, the subset of signals including a first application;
based at least in part on the determination that the subset of signals is associated, monitoring the user device for an indication that the first application is being used; and
based at least in part on the monitoring, detecting that the first application is being used, wherein the detecting of the indication that the task has been completed is further based at least in part on detecting that the first application is being used.

15. The method of claim 12, wherein the first natural language content and the second natural language content include at least one of: audio natural language content and written natural language content.

16. The method of claim 12, further comprising: determining contextual information by identifying a natural language phrase corresponding to request for a particular file, and wherein the detecting of the indication that the task has been completed includes determining that a user has sent the particular file based on the file attachment name indicating the particular file.

17. One or more computer storage media having computer-executable instructions embodied thereon that, when executed, by one or more processors, cause the one or more processors to perform a method, the method comprising:
   detecting, from first natural language content, a task, the task indicates an action to be accomplished by one or more users;
   based at least in part on the task, determining that a subset of attachment file names or types, of a plurality of attachment file names or types which are not directly part of the natural language content, indicate completion of the task;
   based on the determining, pruning a data structure that indicates the plurality of attachment file names or types, the pruning includes removing a portion of the data structure that does not represent the subset of attachment file names or types;
   based at least in part on the pruning, monitoring a user device for the subset of attachment file names or types;
   based at least in part on the monitoring, detecting at least one attachment file names or types, of the subset of attachment file names or types;
   based at least in part on the detecting of at least one attachment file names or types, detecting, from second natural language content, the indication of completion of the task; and
   based at least in part on the detecting of the indication that the task has been completed, causing presentation, at the user device, of an indicator representing completion of the task.

18. The computer storage media of claim 17, further comprising:
   wherein the determining that a subset of attachment file names or types, of a plurality of attachment file names or types, is associated with an indication of completion of the task includes determining that a set of words that are a part of the task will also be indicated in a reply to the task; and
   wherein the detecting, from second natural language content, the indication of completion of the task includes detecting, from the second natural language content, the set of words.

19. The computer storage media of claim 17, the method further comprising, causing presentation, at the user device, of a user interface element indicative of removal of the task upon user-selection of the user interface element.

* * * * *